(12) United States Patent
Phillips et al.

(10) Patent No.: US 6,193,154 B1
(45) Date of Patent: Feb. 27, 2001

(54) METHOD AND APPARATUS FOR VENDING GOODS IN CONJUNCTION WITH A CREDIT CARD ACCEPTING FUEL DISPENSING PUMP

(75) Inventors: Paul Anderson Phillips, Marietta; John Stanley Miller, Fayetteville; Kit Weston Taylor, Stone Mountain, all of GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 08/294,993

(22) Filed: Aug. 24, 1994

(51) Int. Cl.[7] .................................................... G06F 7/08
(52) U.S. Cl. ............................................ 235/381; 235/380
(58) Field of Search ................................... 235/381, 380; 186/3

(56) References Cited

U.S. PATENT DOCUMENTS

| | | |
|---|---|---|
| Re. 31,162 | 3/1983 | Bachmann et al. . |
| 3,187,939 | 6/1965 | Hayes . |
| 3,632,988 | 1/1972 | Yamawaki . |
| 3,774,723 | 11/1973 | Johnston . |
| 3,786,421 | 1/1974 | Wostl et al. . |
| 4,111,282 | 9/1978 | Vayda, Jr. . |
| 4,169,521 | 10/1979 | Vayda, Jr. . |
| 4,189,031 | 2/1980 | Vayda, Jr. . |
| 4,675,515 | 6/1987 | Lucero . |
| 4,767,917 | * 8/1988 | Ushikubo .............................. 235/381 |
| 4,805,738 | 2/1989 | Vayda . |
| 5,016,736 | 5/1991 | Vayda . |
| 5,027,282 | * 6/1991 | Hollidge .............................. 235/381 |
| 5,047,613 | 9/1991 | Swegen et al. . |
| 5,072,380 | * 12/1991 | Randelman et al. ................ 235/383 |
| 5,113,974 | 5/1992 | Vayda . |
| 5,158,155 | 10/1992 | Domain et al. . |
| 5,186,281 | * 2/1993 | Jenkins ................................ 235/383 |
| 5,250,789 | * 10/1993 | Johnsen ............................... 235/383 |
| 5,302,811 | 4/1994 | Fukatsu . |
| 5,450,938 | * 9/1995 | Radamacher ....................... 235/381 |
| 5,493,315 | * 2/1996 | Atchley .............................. 235/381 |
| 5,523,551 | * 6/1996 | Scott .................................. 235/381 |

* cited by examiner

*Primary Examiner*—Harold I. Pitts
(74) *Attorney, Agent, or Firm*—Finnegan, Henderson, Farabow, Garrett & Dunner, L.L.P.

(57) ABSTRACT

A vending machine is usable in conjunction with a credit card accepting self service fuel dispensing gasoline pump. A credit card is initially input to the gasoline pump and approval of the credit card is obtained. A customer is then prompted to purchase a soft drink. The customer can input the quantity type of soft drink desired and coded portions of this information can be transmitted from the gas pump to the vending machine. A code can be generated in the gas pump, which is machine or human readable, and can be printed on a single receipt which further includes a total amount to be charged on a credit card corresponding to the gas dispensed and soft drink quantity purchased. This code can be entered into the vending machine where the soft drinks can be automatically dispensed without the need for further insertion of paper or coin money. Alternatively, a code number need not be issued, and the soft drinks can be automatically credited to or dispensed from the vending machine, through a customer interacting solely with the gas pump.

198 Claims, 16 Drawing Sheets

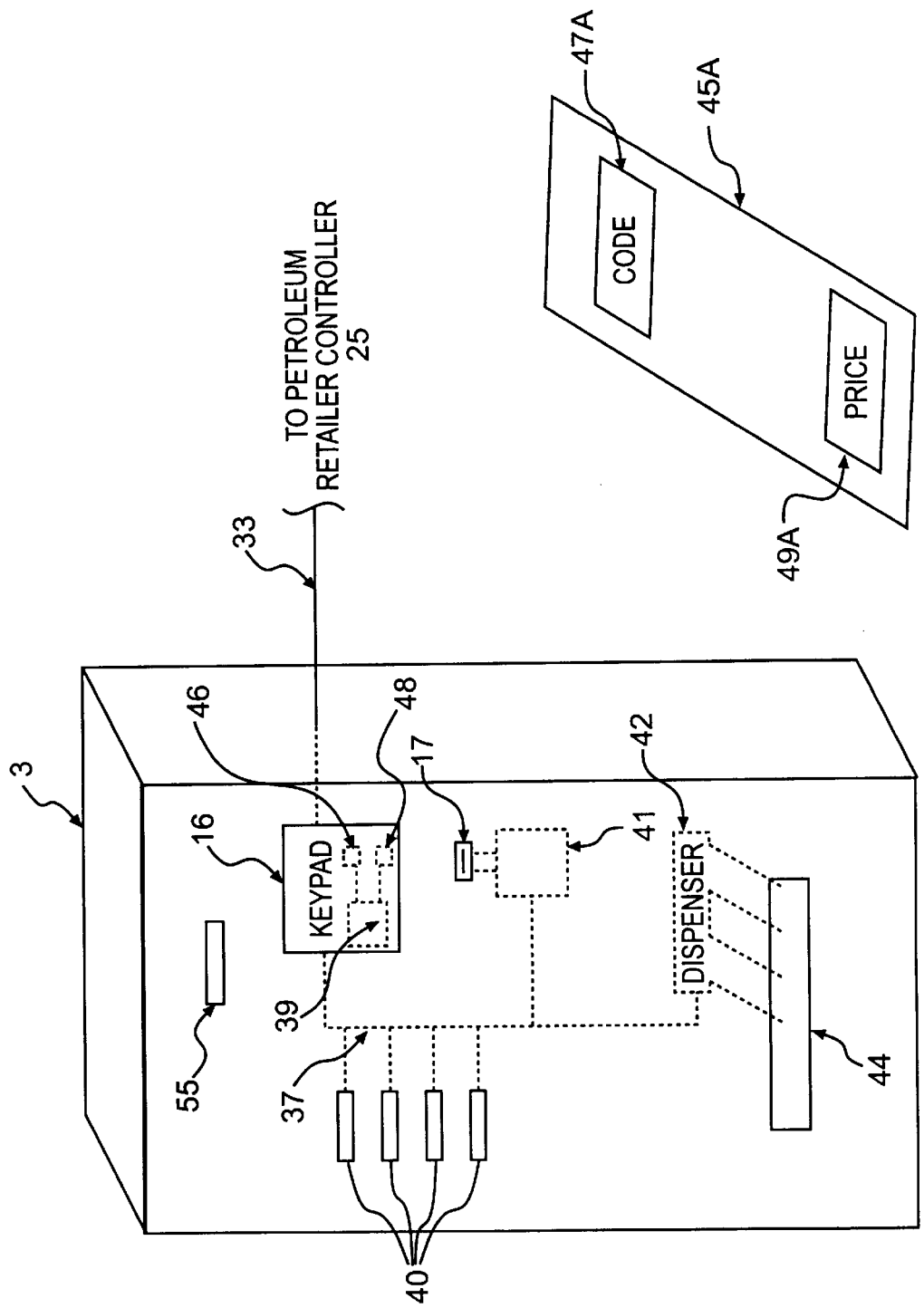

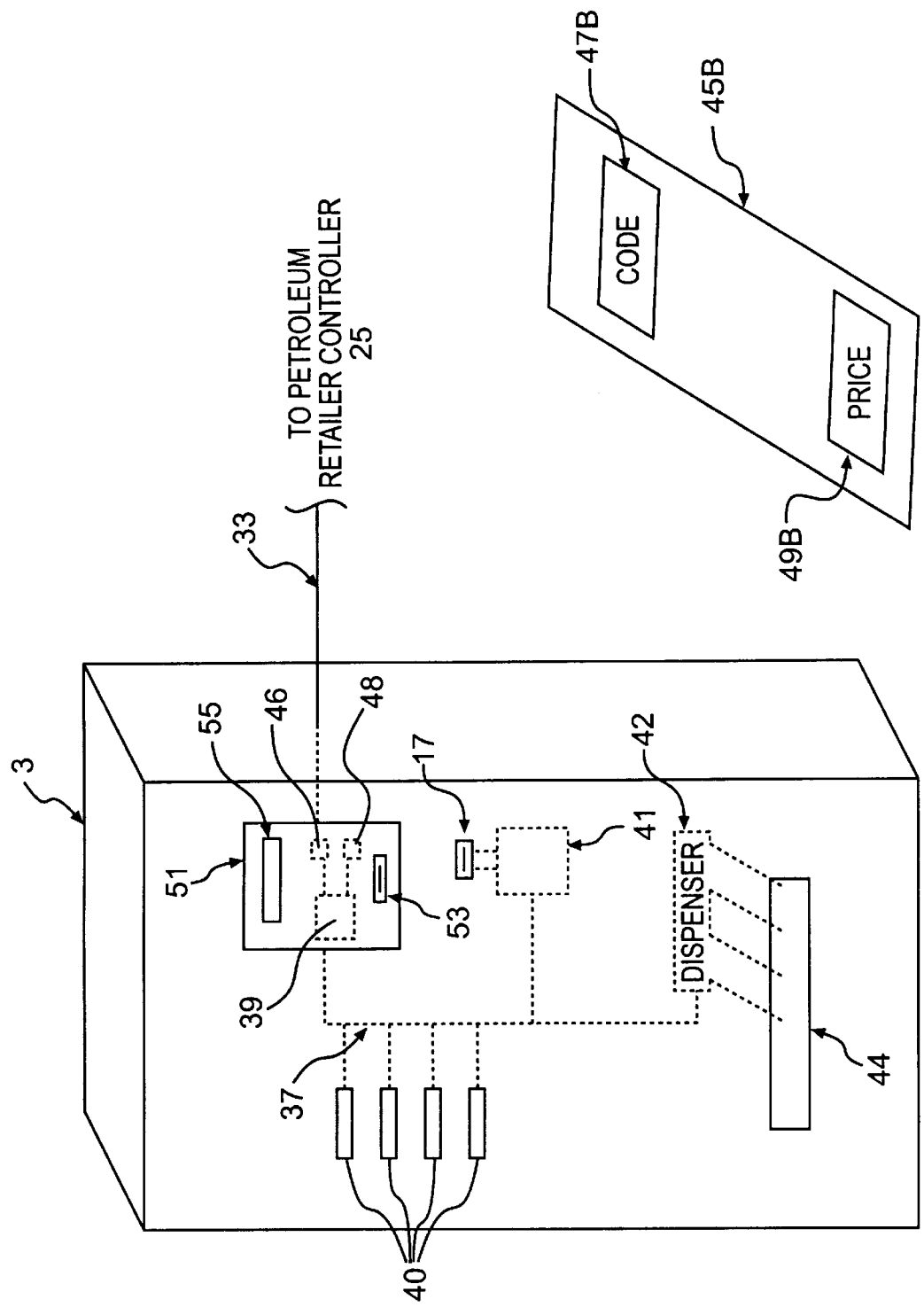

METHOD AND APPARATUS FOR VENDING GOODS IN CONJUNCTION WITH A CREDIT CARD ACCEPTING FUEL DISPENSING PUMP

BACKGROUND OF THE INVENTION

1. Technical Field of the Invention

The present application is directed to an improvement in the field of vending machines 3 for packaged goods such as canned drinks, and is more specifically directed to a vending machine 3 for use in conjunction with a credit card accepting self service fuel dispensing gasoline pumps 1 on a pump island of a vehicle fueling facility, and method for vending in conjunction thereof.

2. Description of Related Art

In the past, vehicle fueling facilities such as gasoline stations included several fuel dispensing pumps 1 on one or more pump islands. A service attendant would pump the gasoline and the driver would make appropriate payment to complete the transaction.

Subsequently, however, many gas stations in many states across the United States for example, and in many other countries, shifted from using gas or service station attendants to pump a customer's gas, to using self service fuel dispensing pumps 1. In such a self-service vehicle fueling facility, a customer could either pre-pay a particular amount to an attendant and pump his own gasoline, or a customer could pump his own gasoline and subsequently pay a gas station attendant an appropriate amount. By utilizing self service fuel dispensing pumps 1, the owner of a vehicle fueling facility or gas station could then reduce his overhead costs since fewer employees were necessary. These costs could then be passed on to the consumer in the form of lower prices for fuel.

The food supplying and marketing industry then took notice of the fact that vehicle fueling facilities now needed only a single or a few employees, placed at a cash register, to collect customer fees for the amount of fuel dispensed at the self service fuel dispensing pumps 1. This spurred the creation of mini-markets at gasoline stations, wherein a customer who was finished pumping gas at this self service fuel dispensing pumps 1 could then enter an area not only housing an employee of the gas station to collect money for the amount of fuel dispensed, but also housing many staple products such as milk and bread for example, and further containing other more popular convenience store type items such as candy, snacks, and soft drinks. Therefore, by the advent of these mini-markets, a person could go to a vehicle fueling facility to fill up his vehicle up with fuel, and could further purchase items which might have to be purchased via a separate stop at a convenience store. The consumer therefore benefitted from this one-stop shopping.

Purchases made via the credit card then became more and more popular. With the popularity of credit cards and with the popularity of self service fuel dispensing pumps 1, came the creation of the self service fuel dispensing pump 1 which accepted and completed credit card transactions without the need for any interaction between the customer and another individual. The customer could then dispense fuel into his car from the self serve fuel dispensing pumps 1 on a pump island of a vehicle fueling facility, and could complete the transaction via the credit card without the need to bother or wait for an attendant of the vehicle fueling facility. Such self service fuel pumps 1 operable by means of a credit card operated as follows.

FIG. 1 illustrates a known vehicle fueling facility which was set up for operation via self service fuel dispensing pumps 1 on pump islands 24, with the pumps being operable by means of a credit card. The gasoline pumps 1 housed credit card readers, with the readers being "dumb" devices controlled from a central controller 20 within a building 18 of the vehicle fueling facility. The credit card transactions took place at the pump 1, and information was communicated through lines 26 to controller 20. Line 28 further illustrated a telephone line 28 connecting controller 20 to a credit card authorization center, for obtaining authorization of the credit card. An explanation of a typical credit card transaction which took place at a known self service gas pump 1 will be explained with regard to FIG. 2 of the present application.

Initially, at step 2, the customer inserted a credit card into a credit card reader at a gas pump 1 such as pump 1 as shown in FIG. 1. Appropriate information was read off the credit card and that information was transferred via lines 26 to controller 20 as shown in FIG. 1. Then, in step 4, the controller 20 sought credit card authorization from a credit card authorization center, in a manner well known to those of ordinary skill in the art.

In step 6, if appropriate authorization was not obtained, a customer message was displayed on the gas pump 1 in step 100. This message basically advised a customer that the card had not been accepted, and conveyed to the customer that the gas pump 1 was not yet operational.

If appropriate authorization had been obtained, the controller 20, in step 8, then requested a temporary credit hold on the credit card and authorized the sale. Thus, the customer was then prompted to begin pumping gas.

The customer pumped the gas in step 10, and in step 12, at the end of the sale, the controller 20 created a record and stored this record for forwarding. The controller 20, in step 14, could then subsequently send a batch of information from stored files and records (corresponding to a number of transactions batched and sent together at one time from a number of customers, for example) to the credit card company. Finally, in step 16, the customer's account would be debited and the retailer's account would be credited to thereby complete the transaction.

Accordingly, although credit card transactions at the gas pump 1 were extremely convenient for the user, the retailer and owner of the vehicle fueling facility did not obtain all possible advantages from utilizing such credit card activated self service fuel dispensing pumps 1. The retailer, for example, who had opened a type of mini-market in the gas station, wished to vend other products as well as sell gasoline. Further, vendors who sold products to the retailer wished the retailer to vend their products. With credit card transactions taking place at the gas pump 1, however, there was no need for the consumer to enter any type of mini-market, since he could complete his transactions at the gasoline pump 1 itself.

Accordingly, there remains a pressing need in the industry to combine the convenience and benefit of a mini-market located at a vehicle fueling facility with the convenience and benefits of self service fuel dispensing pumps 1 operable by means of a credit card.

SUMMARY OF THE INVENTION

It is therefore an object of the present invention to solve the aforementioned problems by providing a machine for vending products or packaged goods such as canned drinks, which is usable in conjunction with credit card activated self service fuel dispensing pump 1 on a pump island of a vehicle fueling facility.

It is a further object of the present invention to provide a method by which a user would be prompted to purchase goods from a second good dispensing apparatus 3, such as a vending machine 3 vending canned drinks for example, through the course of normal operation with a self service fuel dispensing credit card operated pump 1 on a pump island of a vehicle fueling facility.

It is yet another object of the present invention to provide a method and apparatus in which credit card transactions with both a self service fuel dispensing pump 1 and a proximately located vending or goods dispensing apparatus are billed on a single receipt.

It is a still further object of the present invention to provide a method and apparatus which creates a code number, usable in a goods dispensing apparatus proximate to a self serve fuel dispensing pump 1, to thereby enable purchases in the vending machine or goods dispensing apparatus via the same credit card transaction as is used with the self service fuel dispensing pumps 1 (i.e. to avoid a separate coin or paper money transaction in conjunction with the vending machine 3).

It is an even further object of the present invention to provide a method and apparatus for automatically dispensing goods, such as canned drinks, from a goods dispensing apparatus adjacent a self service fuel dispensing pump 1, merely through interaction between the customer and the self service fuel dispensing pump 1 itself.

The objects of the present invention are fulfilled by providing a method, comprising the steps of:

(a) inserting a credit card into a first goods dispensing apparatus;

(b) prompting a user to purchase goods from a second goods dispensing apparatus, separate from the first goods apparatus;

(c) activating the first goods dispensing apparatus for dispensing a first goods;

(d) billing an amount for the dispensed first goods and the purchased second goods to the credit card; and (e) outputting a receipt, of the billed amount, usable for dispensing the second goods from the second goods dispensing apparatus.

The objects of the present invention are further fulfilled by providing a method, comprising the steps of:

(a) inserting a credit card into a first goods dispensing apparatus;

(b) prompting a user to purchase goods from a second goods dispensing apparatus, separate from the first goods apparatus;

(c) activating the second goods dispensing apparatus for dispensing the purchased second goods;

(d) activating the first goods dispensing apparatus for dispensing a first goods; and (e) billing an amount for the dispensed first goods and the purchased second goods to the credit card.

The objects of the present invention are also fulfilled by providing a goods dispensing apparatus, for use in conjunction with a second goods dispensing apparatus, comprising:

first means for activating and controlling the goods dispensing apparatus in response to a transmission from the second goods dispensing apparatus indicating receipt of an input credit card and receipt of an affirmative user response to a prompting of a user to purchase first goods from the goods dispensing apparatus; and second means, responsive to the first means, for dispensing the purchased first goods from the activated goods dispensing apparatus, wherein an amount for dispensed second goods from the second goods dispensing apparatus and an amount for the dispensed first goods from the goods dispensing apparatus are billed to the credit card input into the second goods dispensing apparatus.

Still further, the objects of the present invention are fulfilled by providing a goods dispensing apparatus, for use in conjunction with the second goods dispensing apparatus, comprising:

activation means for activating the goods dispensing apparatus in response to a transmission from the second goods dispensing apparatus indicating receipt of an input credit card and receipt of an affirmative user response to a prompting of a user to purchase first goods from a goods dispensing apparatus;

input means, operatively connected to the activation means, for receiving an input code, subsequent to the goods dispensing apparatus being activated; and dispensing means, operatively connected to the input means, for dispensing first goods from the activated goods dispensing apparatus in response to the received input code, wherein an amount for the dispensed second goods from the second goods dispensing apparatus and an amount for the dispensed first goods from the goods dispensing apparatus are billed to the credit card input into the second goods dispensing apparatus.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 5A and 5B illustrate a goods dispensing apparatus and receipt, respectively, for use in conjunction with one embodiment of the present application;

FIGS. 6A and 6B illustrate a goods dispensing apparatus and receipt, respectively, for use in conjunction with a second embodiment of the present application;

DETAILED DESCRIPTION OF THE PREFERRED EMBODIMENTS

To solve the industry need for a combining of the convenience of one-stop shopping and the convenience of credit card transactions at a self service fuel dispensing pump 1, in one embodiment of the present application, a method and apparatus are disclosed herein which are highly compatible with existing credit card operating self service fuel dispensing pumps 1. Another embodiment disclosed herein requires even less user interaction (i.e. it is a more automatic method and apparatus). A method and apparatus according to a first embodiment of the present application will be discussed subsequently.

Figure 3:
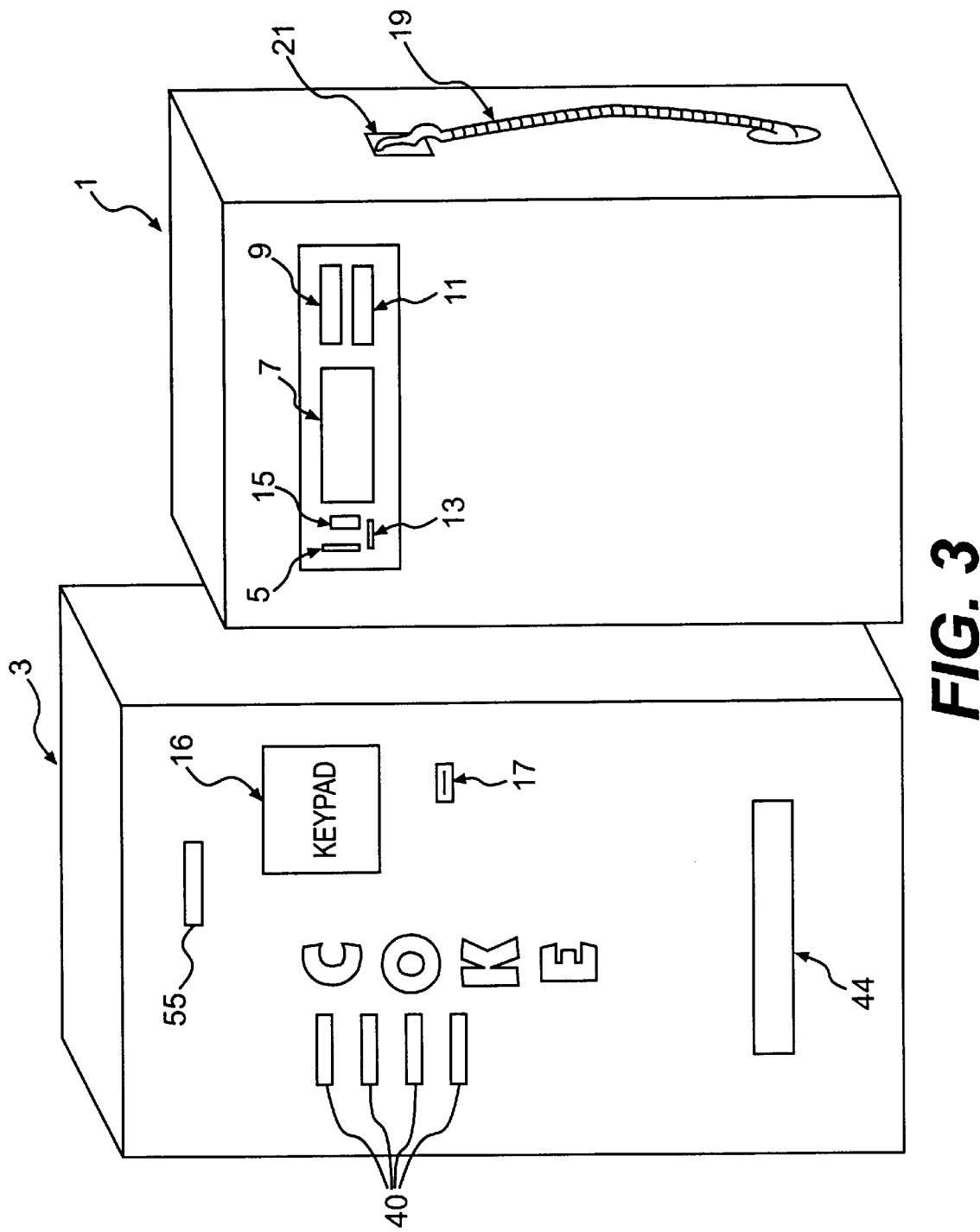
FIG. 3 illustrates a first and second goods dispensing apparatus of one embodiment of the present application.

A first embodiment of the present application involves a first goods dispensing apparatus 1 and a second goods dispensing apparatus as is shown in FIG. 3. The first goods dispensing apparatus 1 is, for example, a self service fuel dispensing pump such as pump 1 as shown in FIG. 3. This pump includes a credit card reader 5, which can be adjacent to the pump 1 or incorporated within the pump 1 as is well known to those of ordinary skill in the art.

The card reader 5 of FIG. 3, includes a slot wherein a credit card is input and further includes reading elements (not shown) internal to the gas pump 1, for reading and storing credit card information which will subsequently be transmitted to a remotely located controller. Since most of the operations aside from the mere reading of a credit card take place external to the gas pump 1, via a controller 25 housed in a remotely located building 23 of the retailer for example, these card readers are known as "dumb" devices. Thus further explanation of these known "dumb" credit card readers will be omitted for the sake of brevity. Alternately, however, "smart" devices can be utilized wherein each credit card reader of each pump includes its own controller which performs the functions of, or in conjunction with, controller 25.

Further, as shown in FIG. 3, the self service fuel dispensing pump 1 includes a display 7 for prompting a customer by displaying various readable messages. Further included is a display 9 for displaying the number of gallons pumped for example, and a display 11 for displaying a total dollar amount to be charged based upon the gallons of fuel which are pumped. These displays 9 and 11 may be combined as a single display if desired. The displays are conventional and thus further description will be omitted.

The self service fuel dispensing pump 1 further includes a printing device 13 for printing and outputting a receipt to the customer, to be explained subsequently. This printer 13 can be any standard printer known to those of ordinary skill in the art, such as a printer used with a conventional credit card operated self service fuel dispensing pump 1, which is also adaptable to print additional information other than the information normally printed during a credit card transaction. This self service fuel dispensing pump 1 further includes a keypad 15, which can be an alphanumeric keypad for example, acting as an input device. The credit card reader 5, printer 13, keypad input from keypad 15, and display 7 are all controlled via controller 25, remotely located in a building of the retailer 23 for example. Each of the aforementioned devices 5, 13, 15 and 7 can include their own CPU, memory, and control circuitry (not shown), which cooperate with controller 25 in a manner well known to those skilled in the art.

Finally, as is shown in FIG. 3, the self service fuel dispensing pump 1 also includes a pump hose and nozzle 19 for dispensing fuel into a customer's vehicle, and a lever 21 which can be used to indicate when fuel dispensing has begun and when fuel dispensing has ended. In other words, prior to a customer pumping fuel, he grasps the hose and nozzle 19, and raises the lever 21 to an upward position. Upon completion of the fueling by the customer, the customer then lowers the lever 21 to a downward position and places the hose and nozzle 19 back on the self service fuel dispensing pump 1. The upward placement of the lever 21, through corresponding control circuitry (not shown), sends a signal to the aforementioned remotely located controller 25. The controller 25 then activates a pumping mechanism of pump 1 to allow a customer to pump fuel. The downward placement of the lever 21 similarly sends a signal to controller 25, and controller 25 then deactivates the pumping mechanism of pump 1, after a customer has completed dispensing fuel into his vehicle. The use of such a lever 21 in conjunction with a controller 25 is well known to those of ordinary skill in the art in known credit card activated self service fuel dispensing pumps 1 for example, and thus will not be further described for the sake of brevity.

FIG. 3 further illustrates a second goods dispensing apparatus, such as a vending machine 3 for vending packaged goods such as snacks, candy, and bottled or canned soft drinks. In one preferred embodiment of the present application, this vending machine 3 is for vending canned soft drinks.

The second goods dispensing apparatus, such as vending machine 3, includes a keypad 16 which can be an alphanumeric keypad for example. The keypad 16 further includes an internal CPU 39, memory 46 (including ROM and RAM for example) and control circuitry 48 as shown in FIGS. 5A and 5B as will be described later in more detail. Further included is a coin slot 17 and a display 55. The display 55 can be used for displaying a credited quantity of goods purchased and not yet vended, as will be explained later. As is further well known to those of ordinary skill in the art, the vending machine 3 can further optionally include a paper money reader (not shown), which allows for insertion of paper money such as one dollar bills and five dollar bills, for the purchase of a soft drink.

Finally, the vending machine 3 includes selection bars or buttons 40, each, when activated, providing for selection of a particular type of kind of soft drink. The number of selection bars 40 on vending machine 3, the location of these selection bars, and the types of drinks or other packaged goods selectable by the use of these selection bars should not be considered in any way to be limiting. These bars 40 are merely shown in an exemplary fashion to provide a selection device for the user to select a particular type or kind of soft drink by pressing one of the selection bars 40.

Further, these selection bars 40 can also include a type of illumination device or a separately located illumination device adjacent thereto, which can indicate to a customer which selections may be available and which selections or types of soft drinks may be "sold out" and thus no longer available. Upon the user inputting a correct code number, or upon the user inputting a correct amount of change through slot 17 or through an alternate paper money reader, the aforementioned illumination devices can then be activated to thereby convey to a customer which selections are available and to convey to the customer that the input code, coin money, or paper money has been accepted.

Finally, as is shown in FIG. 3, a dispensing slot 44 is present. Through this dispensing slot 44, upon a transaction being completed and a particular selection being made via actuation of one of the buttons 40, a canned soft drink or other packaged good will be output from the vending machine 3. Thereafter, the customer can enjoy the canned drink or packaged good obtained from vending machine 3.

Figure 4:
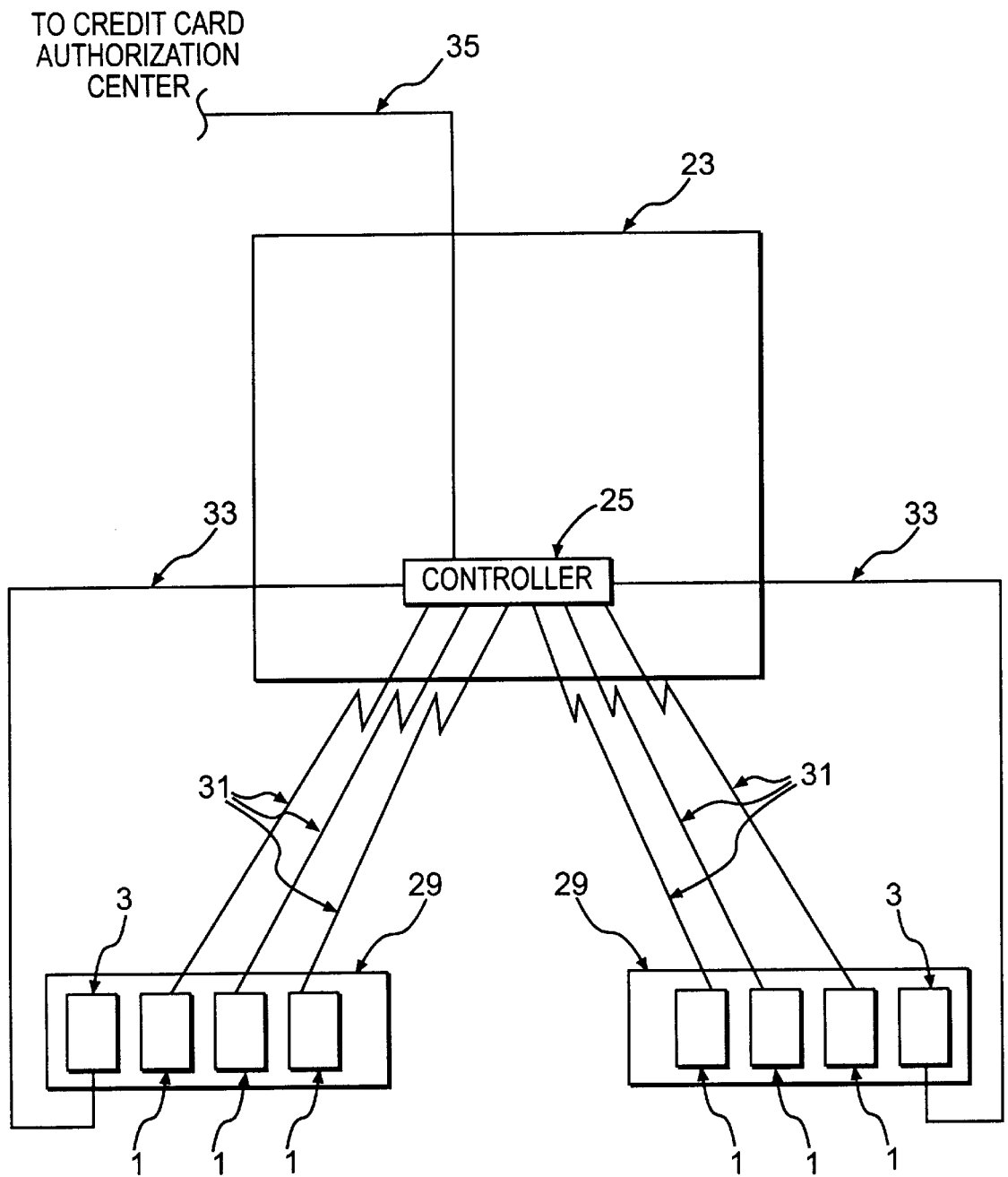
FIG. 4 illustrates a system for conducting credit card transactions in conjunction with various goods dispensing apparatuses of one embodiment of the present application.

FIG. 4 illustrates a system of one embodiment of the present application. This figure illustrates the adaptability of the method and apparatus of a first embodiment of the present application to known credit card accepting self service fuel dispensing pumps 1, and a control system thereof. A controller 25 is connected to each of the pumps 1 via lines 33 to thereby control and receive information from pump components such as the credit card reader 5, printer 13, keypad 15, and display 7 in a manner known to those of ordinary skill in the art. Each of the pumps 1 are shown on pump islands 29. Two pump islands 29 are illustrated, but this is not to be considered limiting in any way, since a single or plurality of pumps can be present on a pump island and a single or plurality of pump islands can be present. In addition, for the method and apparatus of the present application, only a single pump 1 and a single vending machine 3 need be present and they may or may not be located on the same pump island.

The aforementioned controller 25 is housed within a building 23, for example, of the retailer or owner of the vehicle fueling facility. This controller 25 is connected for interaction between the various components of the pumps 1 via connections 31 as shown in FIG. 4, and is further connected to a credit card authorization center through telephone line 35, for example, in a manner well known to those of ordinary skill in the art. The controller 25 is further connected to a vending machine 3, or other second goods dispensing apparatus, via wire 33 for example. The controller 25 includes a CPU, memory (RAM and ROM for example), and control circuitry (each not shown) for communicating with the vending machine 3 and gas pump 1 as will be explained later.

Alternatively, however, the connections between the controller 25 and the pumps 1, and the connections between the vending machine 3 and the controller 25, can be any type of connection used to transmit information such as a wire, an optical connection, a radio frequency (RF) connection, or an infrared (IR) connection. Thus, the controller 25 can transfer information to and from each of fuel dispensing pumps 1 and can further transfer information to and from the vending machine 3 or goods dispensing apparatus via various mediums of transmission. It should be noted, however, that if various mediums such as optical transmission, RF and IR are used for data transmission, the pump 1, controller 25, and vending machine 3 will require appropriate transceiver equipment, operating under proper protocol, as is well known to those of ordinary skill in the art.

When connection between controller 25 and the fuel dispensing pumps 1 and/or the vending machine 3 is a wire connection, a 3-wire unbalanced serial data link can be used, with a separate transmit, receive, and ground wire. The transmission speed is preferably 9600 baud for transmitting 8 information bits, no parity bit, and 1 stop bit. The RS-232C interface is preferably used with standard levels of 0=+10 volts, 1=−10 volts. No hardware handshaking is necessary.

Alternatively, connection between controller 25, pumps 1 and/or vending machine 3 can be via a 2-wire balanced serial data link, wherein one wire is a transmit/receive+ and the other is a transmit/receive−. The transmission speed is again preferably 9600 baud for transmitting 8 information bits, no parity bit and 1 stop bit. The RS-485 is preferably used with standard levels of 0=−5 volts (relative), 1=+5 volts (relative). Handshaking is used to toggle the transmitter on/off.

The connection(s) can further alternatively be a power-line carrier serial data link. The transmission is then preferably 1200 baud for transmitting 8 information bits, no parity bit, and 1 stop bit. The RS-232C interface is preferably used with standard levels of 0=+10 volts, 1=−10 volts. Handshaking is used to toggle the transmitter on/off.

Another alternative is to use a radio carrier serial data link with a 9600 baud transmission speed for transmitting 8 information bits, no parity bit, and 1 stop bit. CW modulation at 310 MHZ is preferred, wherein 0=no carrier, 1=carrier. Handshaking is used to toggle the transmitter on and off.

The above list of alternative controller, pump, and/or vending machine connections is merely exemplary. One of ordinary skill should recognize that other types of wire, RF, IR, and optical connections are usable, with proper transceivers and protocol applied.

FIGS. 5A and 5B illustrate the internal components of the vending machine 3, and a receipt 45A usable in conjunction with the vending machine 3, respectively.

FIG. 5A shows the keypad 16 of vending machine 3. This keypad 16 includes an internal keypad controller 39, memory (ROM and RAM included for example) 46 and control circuitry 48, each internal to the vending machine 3, being interconnected and further being connected to other components internal to vending machine 3, via an internal bus 37. Information input through the keypad 16 can be stored and/or transferred via bus 37 to other internal vending machine components. The bus 37 further connects the keypad 16 to the selection bars 40, display 55, money receiving section 41 (for coin and/or paper money scanning detecting and receiving) and dispensing section 42. Each of the display 55, group of selection bars 40, money receiving section 41, and dispensing section 42 includes a corresponding controller, memory (RAM and/or ROM), and control circuitry (each not shown) for connection and cooperation with internal bus 37 and other internal vending machine components, if necessary, as is known to those skilled in the art. Thus, information such as the input of an appropriate amount of money, detected by element 41, or information input via keypad 16, can be conveyed to other internal components via bus 37.

The keypad controller 39 is a type of central processing unit (CPU) and cooperates with control circuitry 47 and necessary memory 45, such as random access memory (RAM) for temporarily storing information and read only memory (ROM) for storing appropriate program and control information for controlling the CPU. The keypad controller 39 further gateways communication with controller 25 via line 33 (or other appropriate transmission medium) and performs protocol conversion between the external controller 25 and the internal bus 37 as will be described later.

The dispensing section 42 is for controlling the dispensing of purchased and selected soft drinks through slot 44. Further discussion regarding the known operations such as receipt of the appropriate amount of money, the selection via selection bars 40, the display of display 55, and the dispensing via dispensing section 42, for example, will not be given for the sake of brevity since these processes are well known to of ordinary skill in the art. FIG. 5B illustrates a receipt 45A which is issued by gas pump 1 via printer 13. The receipt includes price information in an area 49A for example, indicating an amount billed for first goods purchased from the first goods dispensing apparatus 1, and for second goods purchased from second goods dispensing apparatus. Further, the receipt 45A as shown in FIG. 5B includes a code or code number in a second area 47A. This code number, as will be explained later, can be input into vending machine 3, via keypad 16 to allow the customer access to the vending machine 3 to dispense packaged goods such as canned drinks, without the need for use of appropriate coin or paper money. These areas 47A and 49A are not to be considered limiting in any way since the price information and code information can be placed on any portion of the receipt 45A as shown in FIG. 5B. Areas 47A and 49A are merely given for exemplary purposes.

FIG. 6A shows a vending machine or goods dispensing apparatus with an input device of an alternate embodiment of the present application. This vending machine includes each of the elements previously shown in FIG. 5A, except for keypad 16. Replacing keypad 16 is a type of code reading device 51. The code reading device 51 includes an input slot 53, and a display area 55. This code reader can be a type of barcode reader for example, or can be any conventionally known type of alphanumeric character reader as would be well known to those of ordinary skill in the art. The code reader 51 operates in a manner similar to that described regarding keypad 16, once the input information has been read. Thus, it also includes an internal CPU 39, memory 45 and control circuitry 47 and cooperates with internal bus 37 and controller 25 in the same manner as keypad 16.

FIG. 6B illustrates a receipt 45B. This receipt includes an area 49B displaying pricing information for goods dispensed from both the first and second goods dispensing apparatus similar to the area of 49A as shown in FIG. 5B and it further includes a code in area 47B. However, while the code in area 47A is human readable (numeric or alphanumeric for example), so that a customer can read the code and manually enter the code through the keypad 16 of FIG. 5A, the code in area 47B of FIG. 6B is a machine readable code, such as a barcode for example, which can be read by code reader 51 upon being input into slot 53. Both the human readable code in area 47A of FIG. 5B and the machine readable code in area 47B of FIG. 6B can be generated by printer 13 in a manner well known to those of ordinary skill in the art. Thus, it should be understood that printer 13 for a first embodiment of the present application generates a human readable code in area 47A of receipt 45A as shown in FIG. 5B, or generates a machine readable code such as a barcode for example, in area 47B of receipt 45B as shown in FIG. 6B accordingly to an alternate first embodiment of the present application.

Elements shown in FIG. 5A corresponding to like elements (with the same reference numeral) shown in FIG. 6A will not be further explained for the sake of brevity. Operation interaction of the elements which differ between the system of FIG. 5A and the system of FIG. 5B, however, will be separately explained in a description of operation of both alternate formats of the first embodiment of the present application, with regard to FIGS. 7–9 of the present application.

Operation of a first embodiment of the present application will be discussed with regard to FIGS. 7–9. This embodiment involves some manual interaction between a customer and a vending machine 3, as well as the gas pump 1. However, although this first embodiment may involve some manual interaction between vending machine 3 and the customer, it is easily adaptable to the self service fuel dispensing pumps usable in conjunction with credit cards which already are in existence today and which are well known to those of ordinary skill in the art. A second embodiment will subsequently be discussed, with regard to FIGS. 10–12, which involves a more automatic vending of goods from a second goods dispensing apparatus such as a vending machine 3, via customer interaction with the self service fuel dispensing pump 1.

Figure 7A:
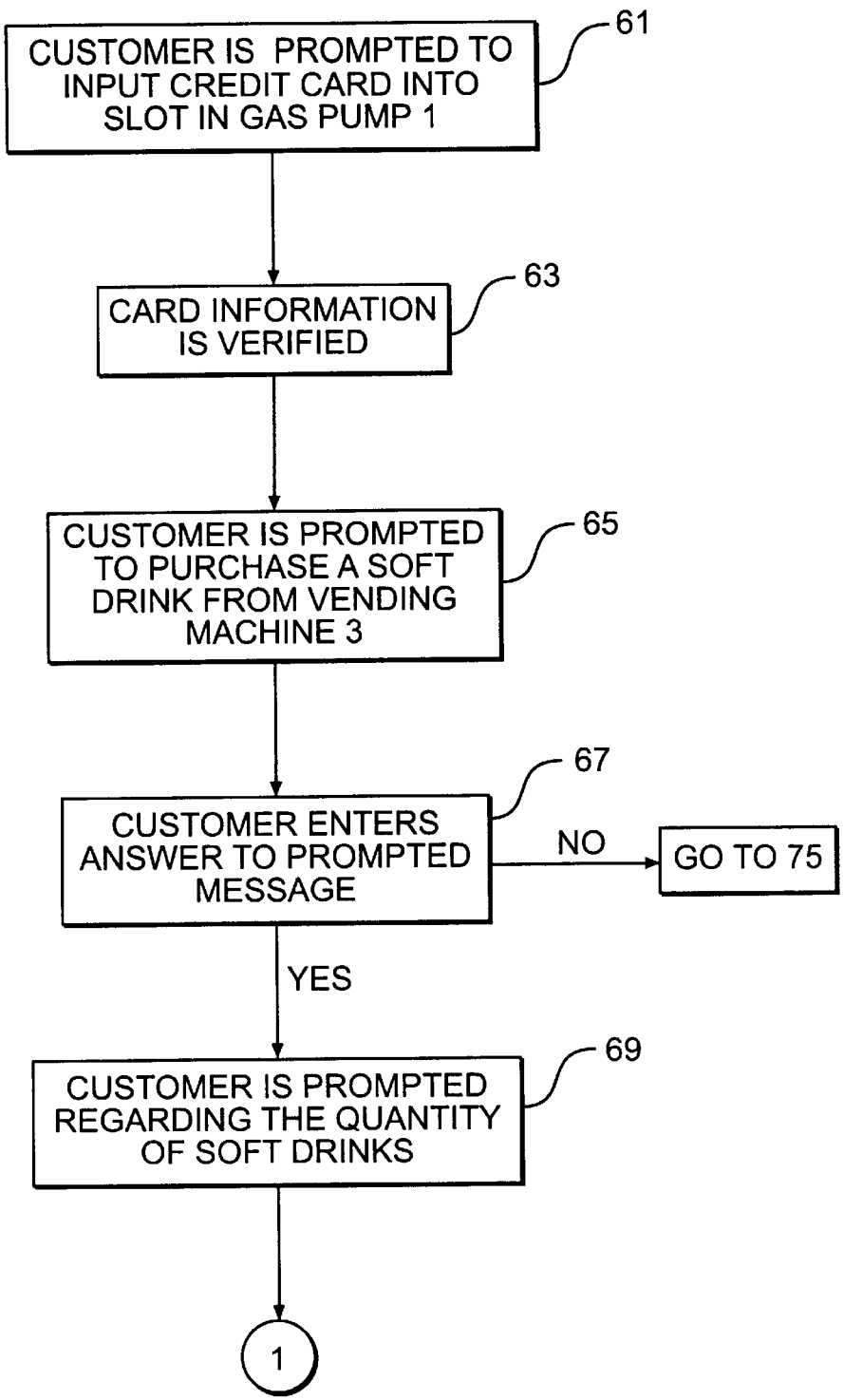
FIGS. 7A and 7B are flow charts illustrating customer interaction in conjunction with a method and apparatus of one embodiment of the present application.
Figure 7B:
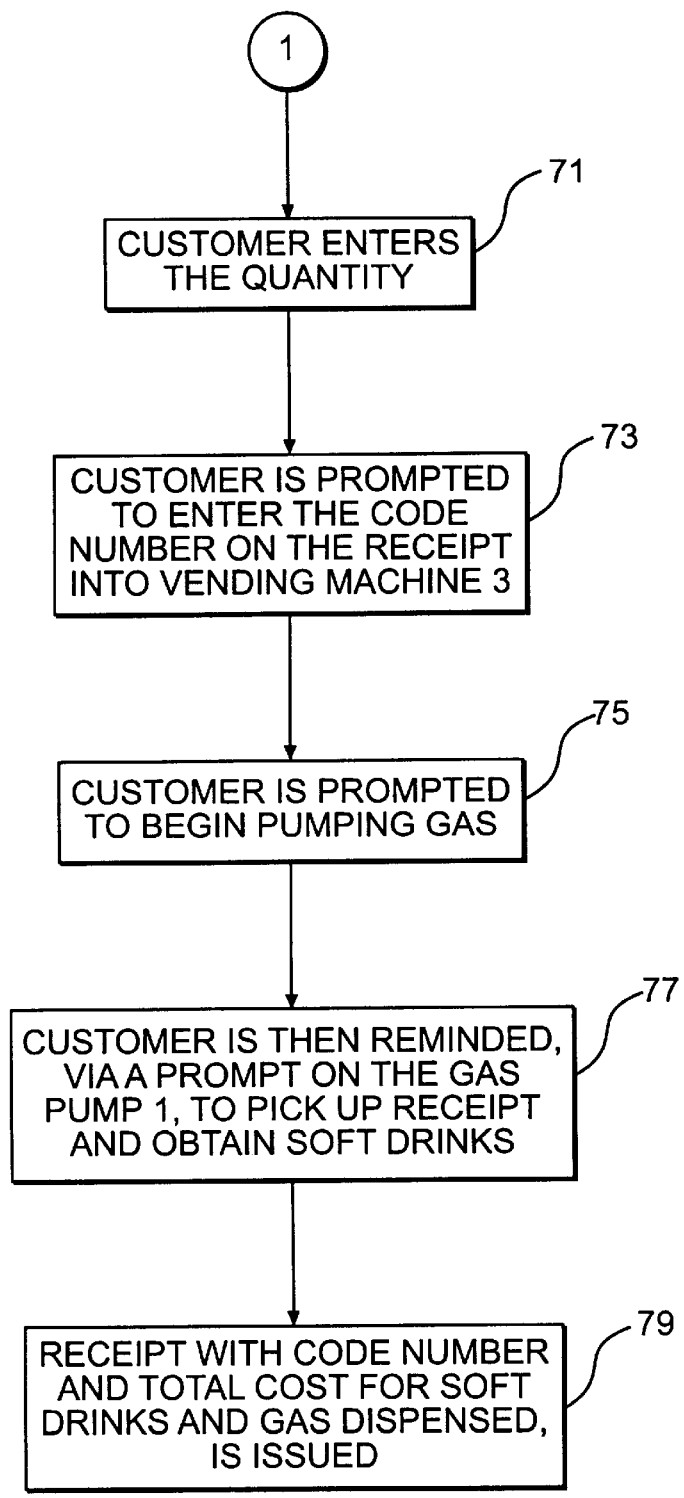
Figure 8A:
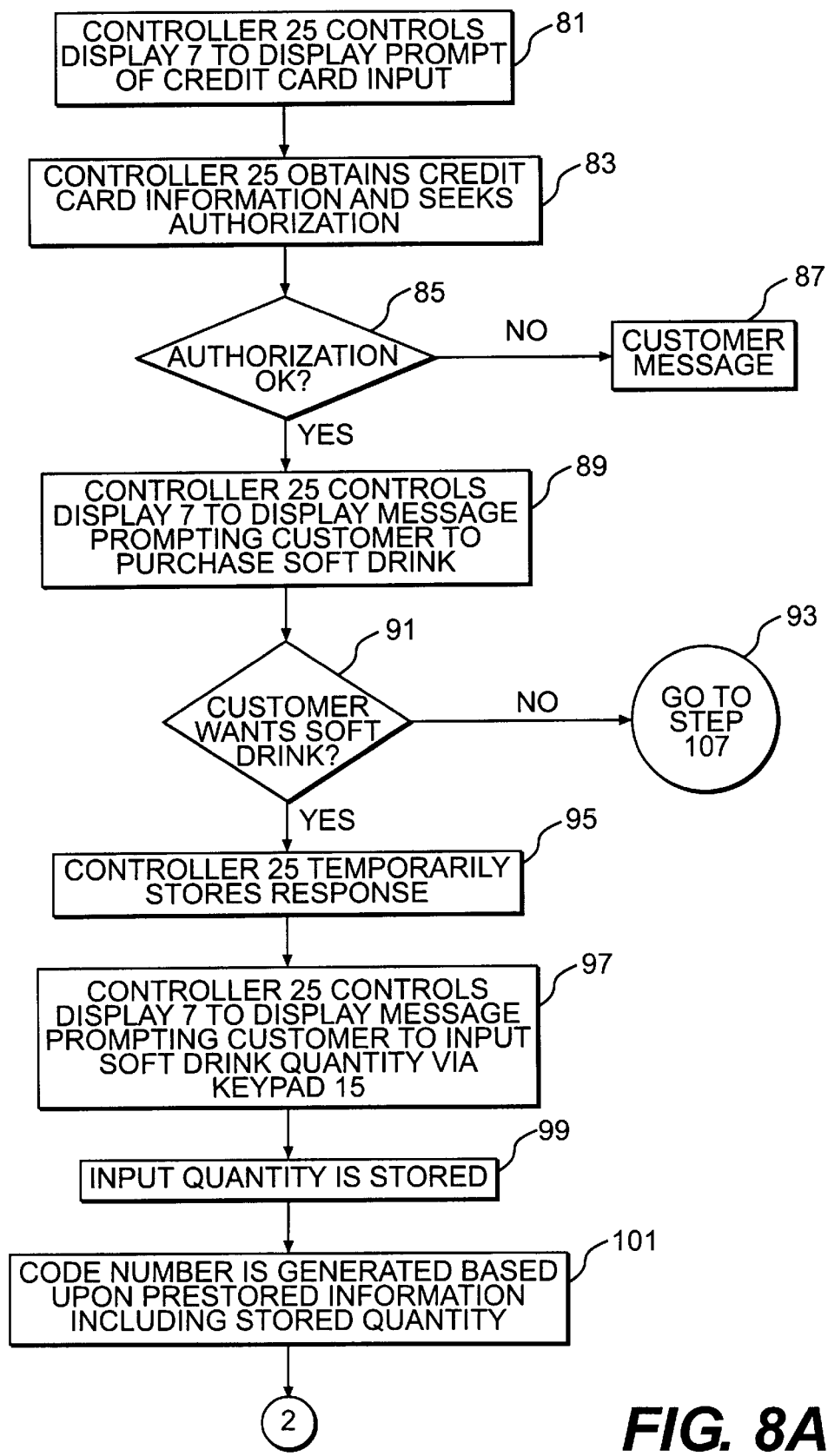
FIGS. 8A and 8B illustrate operations occurring in a fuel dispensing apparatus 1 in conjunction with a method and apparatus of one embodiment of the present application.
Figure 8B:
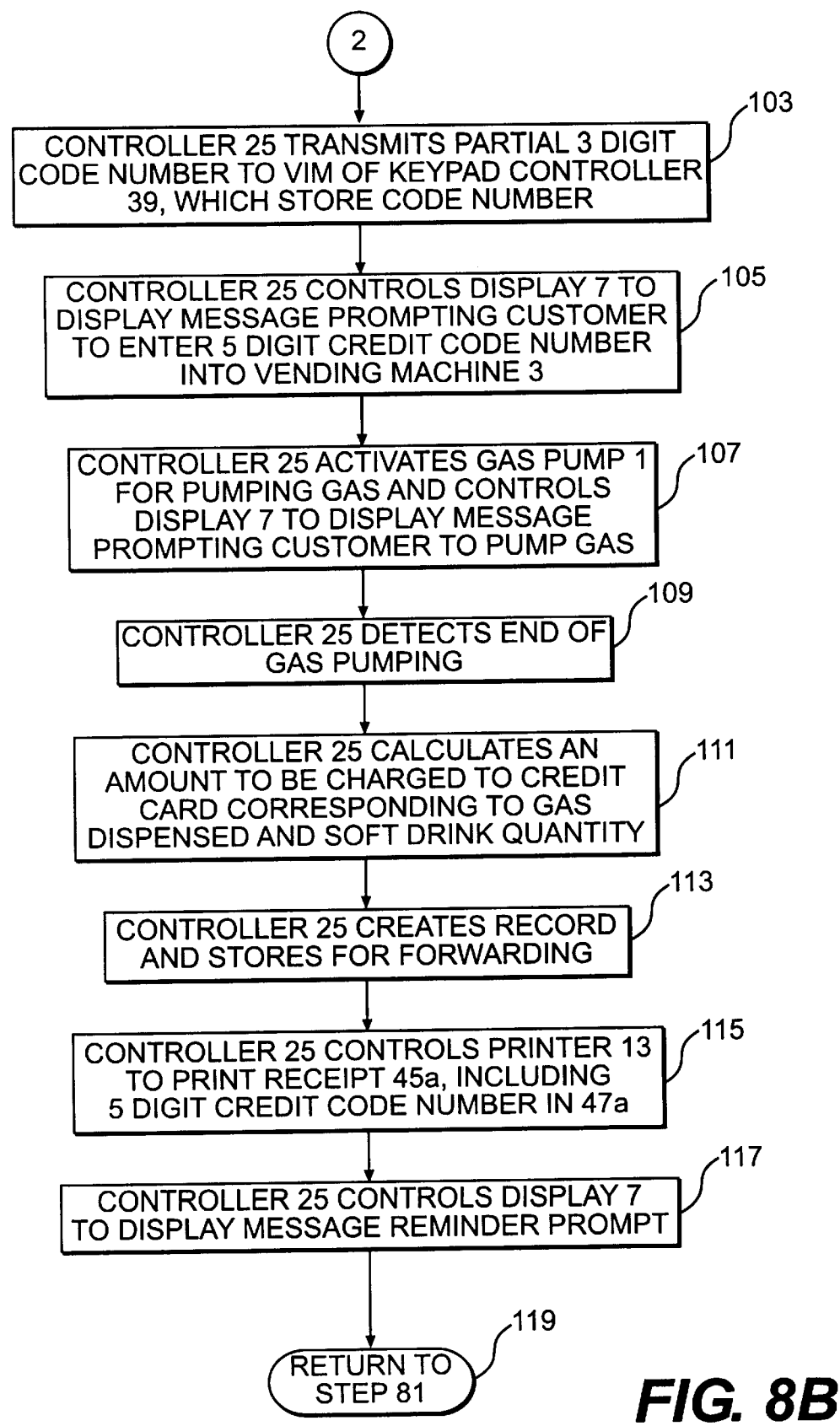

FIGS. 7A and 7B illustrate a first embodiment of the present application from the viewpoint of a customer. FIGS. 8A and 8B illustrate the first embodiment of the present application from the viewpoint of controller 25. Finally, FIG. 9 illustrates a first embodiment of the present application from the viewpoint of keypad controller 39, corresponding to keypad 16 or machine readable code reader 51 housed within a vending machine 3 for example. The steps present in these five figures will be discussed together.

As shown in FIG. 8A, in step 81, a controller 25 initially controls a display 7 to display a prompt requesting credit card input. This is displayed on the fuel dispensing pump or first goods dispensing apparatus 1 as is shown in FIG. 3. From the viewpoint of the customer, the customer is prompted to input his credit card into card reader 5 in a slot in gas pump 1, as is illustrated by step 61 of FIG. 7A.

In step 83 of FIG. 8A, the controller 25 then obtains credit card information from the card reader 5. Authorization is requested via telephone line 35 to the credit card authorization center in a manner well known to those of ordinary skill in the art. The authorization is checked in step 85 of FIG. 8A. If authorization is not received, a customer message will appear in display 7 of pump 1 as is shown in step 87 of FIG. 8A. This customer message will convey to the user that the card has not been accepted and will further convey to the user that the pump has not been activated at this time. The user can either use an alternate method of payment, can insert a new credit card, or can leave the fuel dispensing facility.

From the viewpoint of the customer, the customer merely awaits card information verification in step 63 of FIG. 7A, which is obtained via controller 25 as previously described with regard to FIG. 8A.

Upon the appropriate authorization being received, the controller 25 then moves to step 89 as shown in FIG. 8A. In step 89, the controller 25 controls display 7 to display a message prompting the customer to purchase a soft drink from the vending machine 3 for example, which is proximately located to the gas pump 1. For instance, a message such as "Would you like to purchase an ice cold soft drink from Coca-Cola? YES NO" is displayed on display area 7 of pump 1. From the customer's point of view, as is shown in step 65 of FIG. 7A, the customer views this displayed information which prompts him to purchase a soft drink from vending machine 3.

As shown in FIG. 8A, the controller 25 then moves to step 91 and awaits an answer to the inquiry regarding the purchase of a soft drink from the proximately located vending machine 3. If the customer does not wish to purchase a soft drink, the controller in step 93 then moves to step 107 as shown in FIG. 8B, to allow the customer to pump gas via this credit card transaction in a manner well known to those of ordinary skill in the art. From the customer's point of view, the customer merely enters an answer to the prompted message, by hitting a Yes or No button located on keypad 15 for example, or by hitting a number or letter representing Yes or No, such as a Y for Yes or an N for No for example. If the customer does not wish to purchase a soft drink, the flow chart in FIG. 7A moves from step 67 to step 75 of FIG. 7B, wherein the customer is prompted to being pumping gas via his credit card transaction in a manner well known to those of ordinary skill in the art.

If the customer indicates that he would like to purchase a soft drink or other packaged goods from vending machine 3, the controller 25 temporarily stores this positive or affirmative response in step 95 of FIG. 8A. This response can be stored in a memory (not shown) such as a type of RAM for example, of controller 25. Controller 25, in step 97 of FIG. 8A, then controls display 7 to display a message prompting the customer to input a desired quantity of soft drinks via keypad 15. In other words, from the customer's point of view, the customer is prompted regarding the quantity of soft drinks in step 69 as shown in FIG. 7A. A message such as "How many drinks would you like? Please enter number on keypad" can be such a display prompting the customer regarding the quantity of soft drinks desired.

In step 71 of FIG. 7B, the customer can then enter the desired quantity of soft drinks through keypad 15. Alternately, other input devices such as a touch-screen, for example, can be used. The input quantity is then stored by controller 25 in step 99 of FIG. 8A, in RAM for example.

In step 101 of FIG. 8A, the controller 25 then generates a code number or credit code based upon the stored input quantity (it could also be generated corresponding to type, price, etc.). Further, it should be noted that the prestored information need not be dependent upon the type of code (i.e. human-readable, barcode, etc.) to be generated since the printer can convert the generated code to a printed human-readable or bar code. One example of code generation is as follows.

A credit code is encoded in controller 25 subsequent to a user quantity input being received by controller 25 and stored in RAM for example. Initially, a two (2) digit random number is generated (since random number generation, in general, is known, no further explanation will be given for the sake of brevity). It should be noted that all numeric characters are ASCII digits; i.e. 1=$31='1'. The random number is then assigned a check digit. One example of check digit calculation is as follows.

Check digit calculation can be a simple modification of the standard mod 10 check digit used on most credit cards. Initially, all of the digits of the number to be check digited are added. This is preferably done using the binary value of the numbers, not the ASCII value.

Next, the sum is taken, modulo 10. This produces a number between 0 and 9. This number is then subtracted from 9 to produce a number between 0 and 9. This number is converted back to ASCII to produce the check digit.

The random number, now provided with the check digit can then be transmitted from controller 25 to the vending machine 3 (specifically to a VIM, which is a vending machine interface as will be later described) using an Open Transaction packet as will be described later. The random number (now consisting of a 3 digit code) is preferably transmitted rather than the complete code number for security reasons. When the transmitted random number does not match an input number, it is more difficult to determine a valid code number as will be apparent hereinafter.

The quantity of drinks is then added to the 2 digit random number thereby providing a third digit, with the calculated check digit actually providing a fourth digit. Finally, a random number between 0 and 9 is generated. This random number becomes a format indicator and is preferably used as the first digit of a customer code number or credit code. The format indicator digit can be preferably used, for example, to rearrange the previous digits according to a predetermined formula or table prestored in ROM of controller 25.

The resulting 5 digit credit code number is displayed to the user and printed on the receipt in human readable form on the receipt of FIG. 5A, or in machine readable form on the receipt of FIG. 5B for example. It should be clear that the aforementioned credit code encoding scheme is merely exemplary. Further, the use of a 5 digit credit code should not be considered limiting as other code lengths, containing information pertaining to quantity, which can be adequately decoded and which is reasonably secure can be so utilized.

Similarly, if a machine-readable code is to be generated, the same approach can be used. Instead of outputting a receipt with a 5 digit credit code printed in human-readable form, a bar-code representing the 5 digit credit code can be generated. As long as code reader 53 can then decipher the bar code, keypad controller 39 will be able to obtain the quantity of drinks desired by the user based on the input 5 digit credit code barcode in a manner similar to that previously described.

The controller 25 transmits a 3-digit generated code number (random numbers plus check digit) to keypad controller 39 in step 103, prior to actually completing generation of the 5 digit credit code. The controller 25, which is a store master controller (SMC) and which starts all transmission sessions, sends an Open Transaction packet to VIM (Vender interface module), which is a slave and can only respond to polls, of the vending machine keypad controller 39 (the VIM is not shown). The protocol of the SMC ⇒VIM transmission for the Open Transaction packet is as follows:

Open Transaction Packet

SMC sends the Open Transaction packet as follows:

| SMC | --- | SOH | ---> VIM |
| --- | --- | --- | --- |
| SMC | --- | 1 | ---> VIM command code |
| SMC | --- | # | ---> VIM 2-char ASCII transaction # |
| SMC | --- | # | ---> VIM |
| SMC | --- | # | ---> VIM ASCII can count |
| SMC | --- | # | ---> VIM 3-char ASCII credit code # |
| SMC | --- | # | ---> VIM |
| SMC | --- | # | ---> VIM |
| SMC | --- | # | ---> VIM ASCII mod 10 check digit |
| SMC | --- | EOT | ---> VIM | wherein SOH has a hex value of $01 and a decimal value of 1 and EOT (end of transmission) has a hex value of $04 and a decimal value of 4.

If the packet received is OK, and contains a unique transaction #, the VIM sends an acknowledgement signal to SMC:

SMC←ACK --- VIM wherein ACK has a hex value $06 and a decimal value 6. However, if the packet received has a bad check digit, the VIM identifies this to the SMC:

SMC←NAK --- VIM wherein NAK has a hex value of $15 and a decimal value of a 21. The SMC then retransmits Open Transaction packet.

Finally, if the packet is received, but the transaction # has already been used, the VIM sends an EOT signal to the SMC:

SMC←EOT --- VIM

The SMC calculates a new transaction #. The SMC then retransmits another Open Transaction packet.

This transmission acts to allow or deny access to the vending machine 3. The VIM of keypad controller 39 creates a new memory structure in memory 46 and validates the transaction number (#) as unique. Once this is done, the transaction number (#) is stored along with the 3 digit credit code number (#) in memory 46.

It should be noted that when using a barcode reader, for example, there is less security necessary, since a user cannot randomly input numbers via a keypad. Thus, the security steps taken above may be relaxed in such a situation if desired. Access to a quantity of goods need only be permitted based on an input bar code corresponding to a transmitted 5 digit credit code number for example, in a manner which will be described subsequently, without transmission of an initial 3 digit credit code.

From the viewpoint of the vending machine 3, the VIM of keypad controller 39 of the vending machine 3 receives the 3 digit code number from controller 25 via line 33, or via a type of RF or IR transmission for example. As would be known to those of ordinary skill, if RF or IR technology is utilized, appropriate transceivers would be used for data transmission and reception. This occurs in step 121 as shown in FIG. 9. The VIM then validates the transaction # as unique and stores the transaction # and 3 digit credit code number in a temporary RAM memory for example, in step 123 of FIG. 9.

As shown in FIG. 8B, the controller 25, in step 105, then controls display 7 to display a message prompting the customer to enter the aforementioned 5 digit credit code number into vending machine 3. The 5 digit credit code number need not be displayed at this point, but alternatively the 5 digit credit code number itself could be displayed since it has been generated by controller 25 by this time. From the viewpoint of the customer, as is shown in step 73 of FIG. 7B, the customer is prompted to enter the 5 digit credit code number, which will be printed on a receipt output from the gas pump 1, into vending machine 3. A message such as "Enter the code number on your receipt in the Coke machine and select your product(s)" can be displayed on display 7 of the fuel pump 1 for example.

Subsequently, the customer is prompted to begin pumping gas in step 75 of FIG. 7B. This occurs, as shown in FIG. 8B, in step 107 where the controller 25 activates gas pump 1 for pumping gas and controls display 7 to display a message prompting the customer to pump gas. A message such as "Remove nozzle, lift handle, and begin pumping. Replace nozzle when finished." is displayed on display 7. In actuality, the message prompting the customer to pump gas is displayed initially on display 7, and upon the customer removing nozzle 19 and lifting handle or lever 21, then controller 25 activates gas pump 1 for pumping gas. Controller 25, as previously explained, is connected in a manner well known to those of ordinary skill in the art so as to detect the lifting of the handle or lever 21 so that it can subsequently send a signal via line 31 to pump 1 to activate gas pump 1 for pumping gas.

In step 109 of FIG. 8B, the controller 25 then detects the end of gas pumping, in a manner well known to those of ordinary skill in the art, upon the user lowering handle or lever 21, and replacing gas nozzle 19 to the position shown in FIG. 3 of the present application, for example. The controller 25, either during the pumping of the gas or subsequent to the detection of the end of gas pumping in step 109, then calculates an amount to be charged to the customer's credit card in step 111. This amount to be charged corresponds not only to the gas dispensed, which is calculated based upon the number of gallons pumped and the prestored price per gallon, but also includes a charge for the quantity of soft drinks which the customer previously entered via keypad 15. Thus, only a single receipt need be issued.

Alternatively, the VIM of the vending machine can be polled, as will be explained subsequently, and the VIM replies with a total credit/debit for the entire transaction, which corresponds to the actual quantity of goods vended from machine 3. A prestored or polled price per can or unit of packaged goods can then be used to calculate an amount to be charged on the credit card in step 111. In this case, a receipt is eventually issued which can be only a single receipt containing the 5 digit code number and the total cost (gas vended and soft drink quantity input). Then, if all soft drinks which have been paid for are not vended (because there is a failure or a customer decides to change his mind due to an unavailable selection), the controller 25 can then poll the VIM of vending machine 3 to obtain a total credit/debit for the entire transaction and issue a corrected receipt prior to the transaction ending.

A further alternative is to issue only a single receipt with a disclaimer stating "In the event that product is not delivered, an amount corresponding to non-delivered product will be deducted from your charge or posted to your account." Then, when controller 25 polls the VIM of vending machine 3 to obtain a total credit/debit for the entire transaction, it can adjust the retailer's and customer's accounts accordingly.

Finally, in another alternative embodiment, a separate receipt with 5 digit code number can be issued. A separate total receipt for the amount of gas vended and soft drinks vended can be later prepared.

Figure 1:
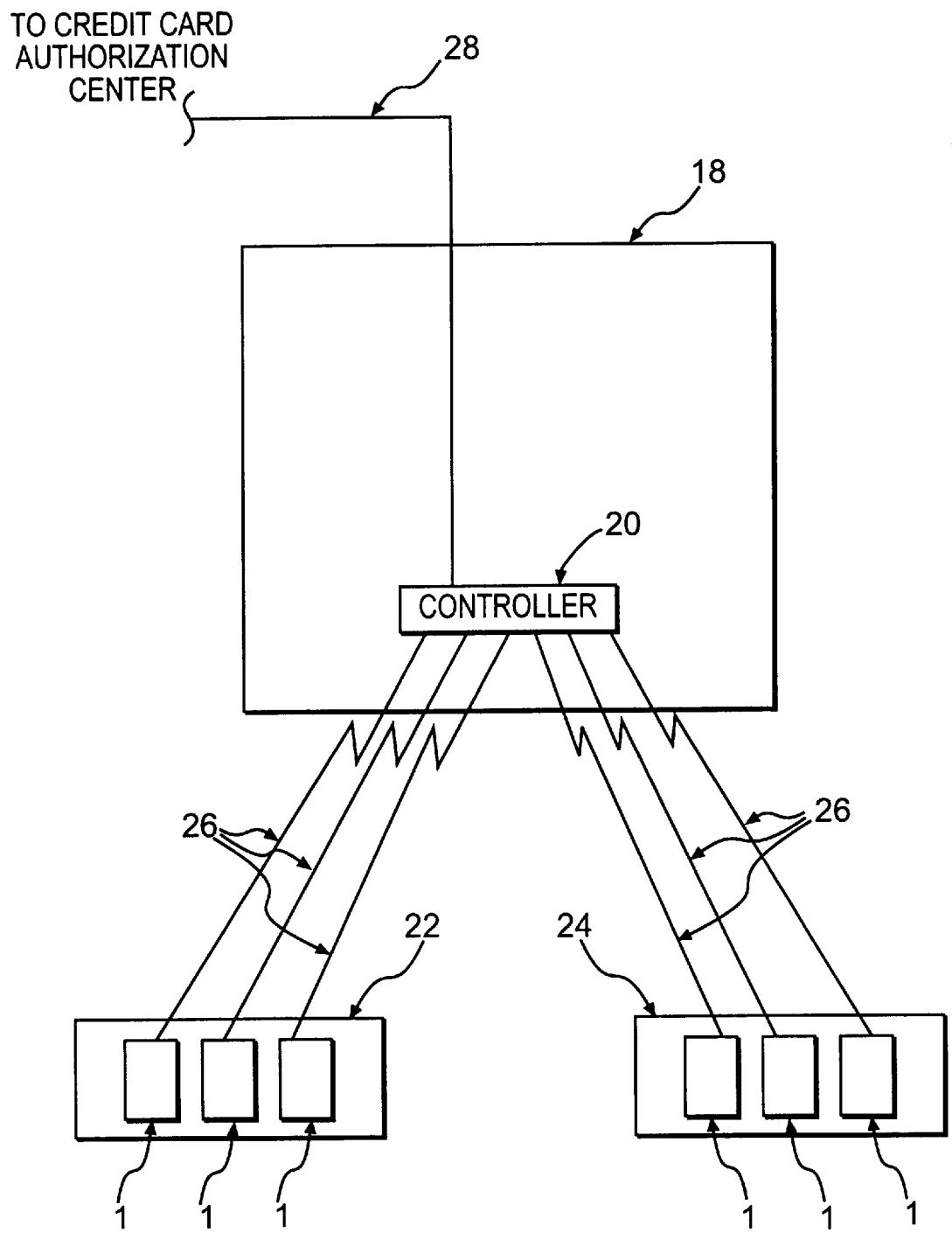
FIG. 1 is a conventional self service fuel dispensing facility utilizing credit card operated fuel pumps 1.
Figure 2:
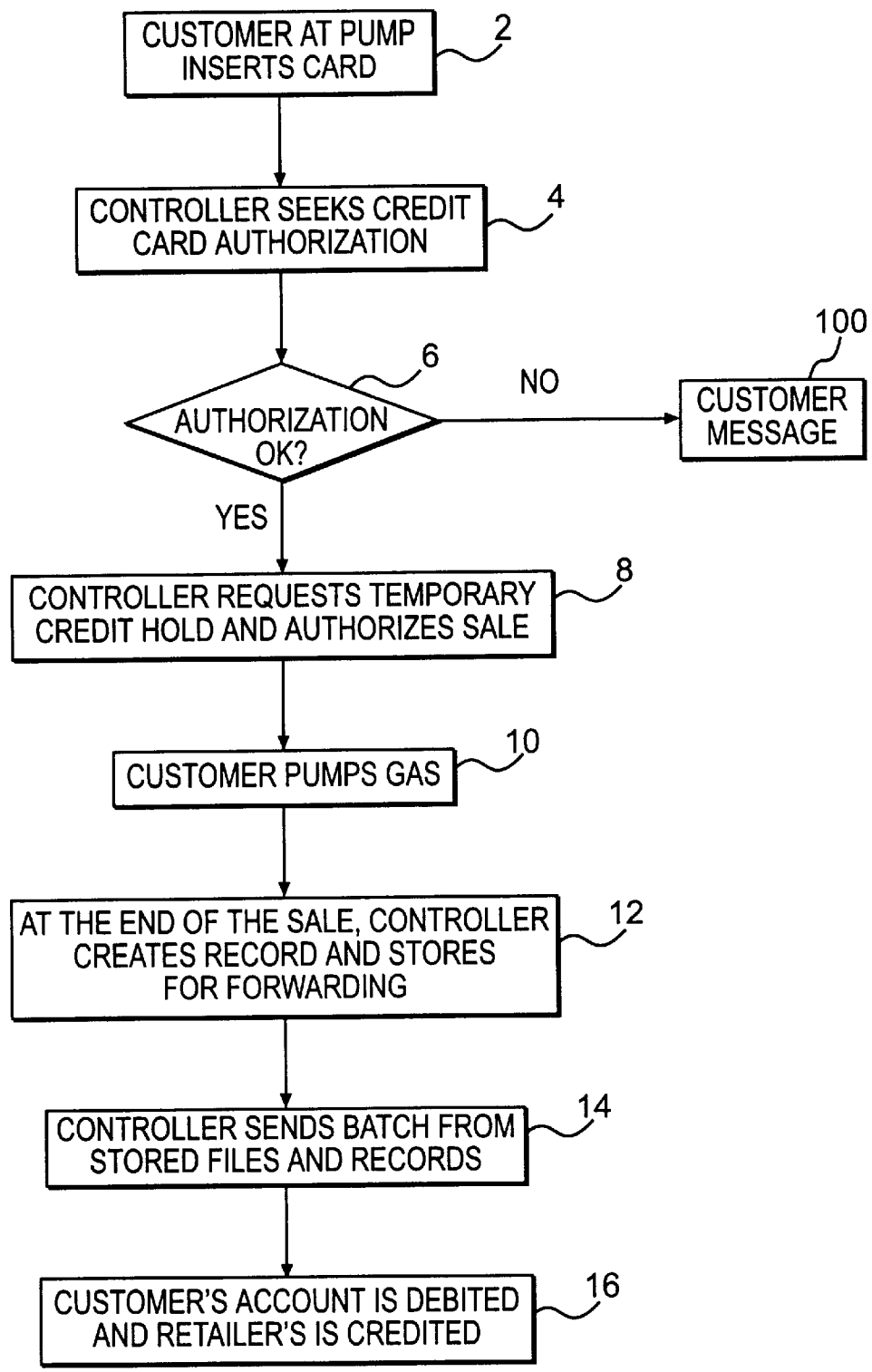
FIG. 2 illustrates a flow chart on the operation of a conventional credit card operated self service fuel dispensing pump 1.

FIG. 8B then moves to step 113 where the controller 25 creates a record and stores this record for forwarding in a conventional manner similar to that described regarding FIG. 2. The controller 25 subsequently sends a batch of records or files to the credit card company, so that the customer's account will be debited for an amount corresponding to the gas dispensed and soft drink quantity vended and purchased, and the retailer's account can be credited accordingly. In step 115, the controller 25 then controls printer 13 to print receipt 45A. The receipt includes not only the total price for gas dispensed and soft drinks purchased in area 49A or 49B as shown in FIGS. 5B and 6B, respectively, but further include the generated 5 digit credit code number in area 47A of 47B, as shown in FIGS. 5B and 6B, respectively. As previously discussed, the code printed on the receipt 45 can be a human readable code in area 47A as shown in FIG. 5B, or can be a machine readable code as shown in area 47B of FIG. 6B of the present application.

Finally, in step 117, the controller 25 then controls display 7 to display a reminder message prompt to the customer. From the customer's point of view, as is shown in step 77 of FIG. 7B, the customer is actually reminded, via a prompt on the gas pump 1, to pick up his receipt from printer 13, and to obtain his soft drinks from vending machine 3. A message such as "Thank you for your business. Please pick up your receipt and enjoy your Coca-Cola products." can be displayed on display 7 for example. Thus, from the customer's viewpoint, a receipt with a 5 digit credit code number, of either a machine readable code or a human readable code, and a total cost for the quantity of soft drinks purchased and the gas dispensed is issued in step 79. Thus, whether or not two receipts are eventually issued, the customer will eventually have a single receipt indicating payment of both soft drinks and gas dispensed is issued to a customer, thereby alleviating any need for the customer to insert separate change or paper money into the vending machine 3 to purchase any desired soft drinks. The controller 25, upon the user taking his receipt from printer 13, then controls display 7 to display a prompt requesting input of a credit card by a user as shown in step 81 of FIG. 8A for example.

Figure 9:
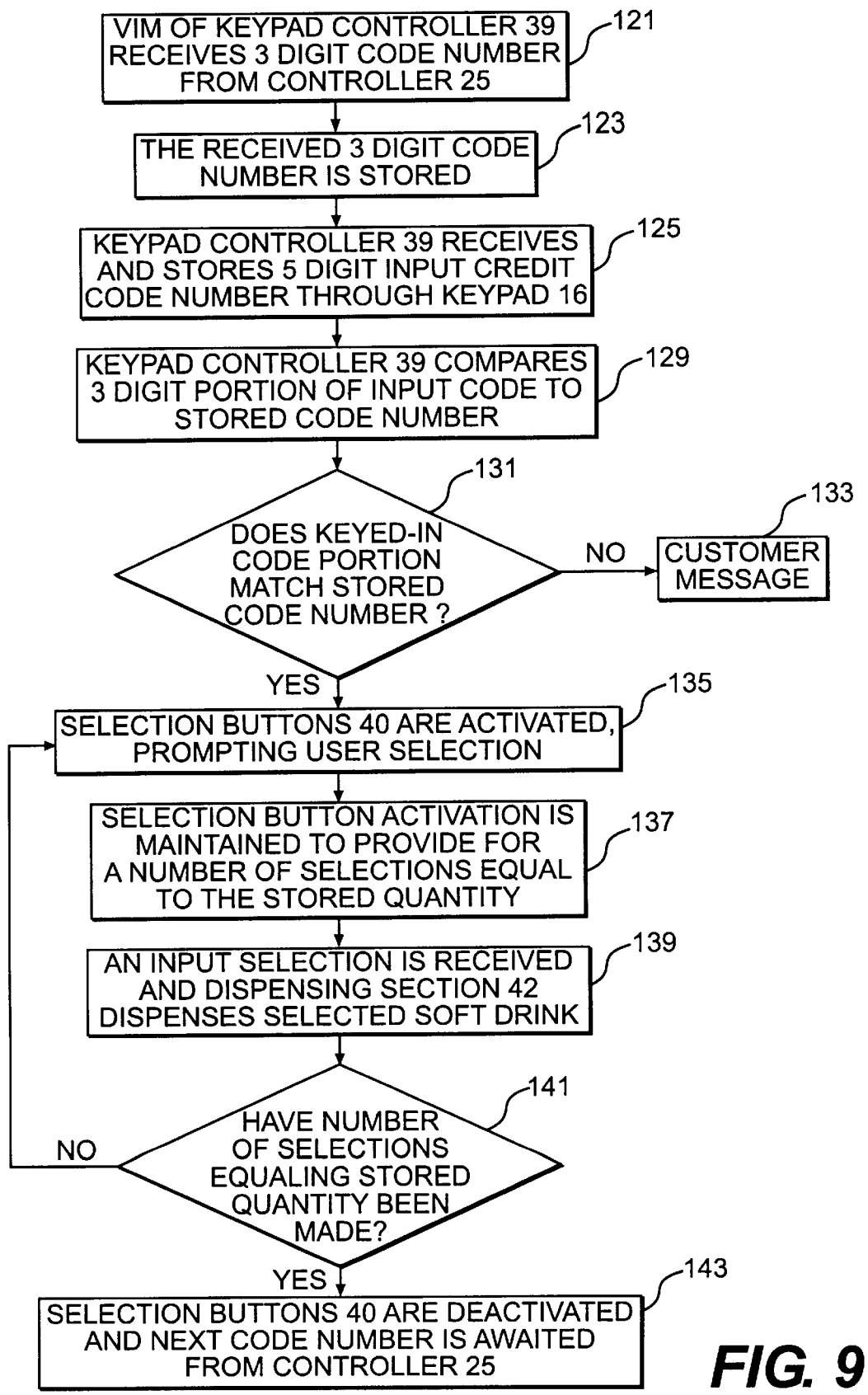
FIG. 9 illustrates operations occurring within a soft drink dispensing apparatus in conjunction with a method and apparatus of one embodiment of the present application.

As previously stated with regard to FIG. 9 of the present application, the VIM of the keypad controller 39 of the vending machine 3 initially receives a 3 digit code number from controller 25 in step 121 and stores the received transaction number (#) and 3 digit code number in step 123.

The customer then takes his receipt, and either enters the 5 digit credit code number via keypad 16 as shown on the vending machine in FIG. 3 if the code is a human readable code shown in area 47A of FIG. 5B, or alternatively inputs a receipt 45B containing a machine readable code in area 47B into a machine readable code reader 51 through slot 53 as shown in FIG. 6A.

The resulting 5 digit credit code, when entered into the Coke or vending machine 3 by the user via keypad 16 or bar code reader 51, is initially unformatted. The VIM sends a start session signal to VMC (vendor master controller) of keypad controller 39. The VMC then begins the unformatting process. This is done using the first digit of the 5 digit credit code as a format indicator digit. A predetermined formula or table prestored in ROM 46, which corresponds to the predetermined formula or table stored in ROM of controller 25, is then accessed using the first (format indicator) digit. The table or formula, depending on the first digit, then unformats the remaining 4 digits of the 5 digit credit code to identify which digit corresponds to each of the two random numbers, the quantity, and check digit. The unformatted 5 character credit code is then checked for a correct check digit in step 129 against that sent from controller 25 in step 121 (one digit of the 3 digit code). The random numbers are then extracted and compared in step 129 against the queue (the remaining two digits of the previously stored 3 digit code number from controller 25) in memory. If both of the aforementioned tests or comparisons are passed, the user input 5 digit credit code is accepted in step 131. An accepted number is immediately erased from the queue to prevent reuse. No numbers, however, are erased when an invalid entry is made. This provides for user mistakes made during key input, for example, and allows the user to retry input of his credit code number. The VMC can then extract the input quantity from the unformatted 5 digit credit code.

Display 55 of FIG. 6A can then display to the user, for example, and indication of whether or not the input code or bar coded receipt is a valid entry, by lighting a green light for example. Further, display 55 can display the quantity of soft drinks to be dispensed, based on the quantity extracted from a valid 5 digit credit code number input by the customer. A similar type display 55, displaying quantity of soft drinks to be dispensed, for example, can also be used in the manual input embodiment shown in FIG. 5A of the present application.

If the extracted numbers do not match those stored in memory, a customer message is displayed (or a red light is lit) in step 133 on a display 55 or a similar type of display, thereby denying access to a customer. The customer can then either re-input the 5 digit credit code number via keypad 16, or can re-insert the machine readable receipt 45B into slot 53 as shown in FIG. 6A. An appropriate number of attempts, such as three for example, could be provided to the user before the vending machine 3 will no longer accept an input code number. This again acts to prevent access via random number input and in the machine-readable code embodiment for example, can be optional.

The SMC 25 continuously polls the VIM of keypad controller 39 at this time, awaiting a total debit/credit for the quantity of goods vended by vending machine 3. The SMC 25 sends a Poll Transaction packet as follows:

Poll Transaction Packet

SMC sends Poll Transaction packet

| SMC | --- | SOH | ---> VIM |
| --- | --- | --- | --- |
| SMC | --- | 4 | ---> VIM command code |
| SMC | --- | # | ---> VIM 2-char ASCII transaction # |
| SMC | --- | # | ---> VIM |
| SMC | --- | # | ---> VIM ASCII mod 10 check digit |
| SMC | --- | EOT | ---> VIM |

If the packet received is OK, the VIM will indicate (at this time) that the transaction is still in progress (or not yet started), i.e. the machine 3 has not yet vended any products:

SMC←NAK --- VIM

If the packet has been received with a bad check digit, the VIM will notify the SMC as follows:

SMC←NAK --- VIM

The SMC then retransmits the Poll Transaction packet.

If the appropriate portions (3 of 5 digits of credit code numbers) of the keyed in or machine read input code matches the stored 3 digit code number received from controller 25, the keypad controller 39 then moves to step 135 of FIG. 9. In this step, the keypad controller 39, via bus 37, sends a signal requesting the display section controller to activate selection buttons 40, thereby prompting a user to select one of a variety of types of soft drinks or flavors of soft drinks. The selection buttons 40 can be controlled to be illuminated by a display section controller for example, upon keypad controller 39 determining a match in step 131, or separate display lights (not shown) can be activated next to each of the selection buttons 40.

In an alternative embodiment of the present application, the number of cans or packaged goods remaining in the machine, corresponding to each of the selection buttons 40, can be monitored. Upon the keypad controller 39 detecting, in a manner well known to those skilled in the art, that a particular selection or type of soft drink is unavailable with no more of that soft drink remaining in the machine, the keypad controller 39 then could activate only available selections or selection buttons 40 in step 135. This could avoid unsuccessful vends. Further, if no more products remain in the vending machine 3, the keypad controller 39, upon being polled by SMC 25, could transfer this information to the retail controller 25 whereupon steps prompting a customer to purchase a soft drink could be skipped until the vending machine 3 is supplied with more soft drinks. Also, keypad controller 39 could also transfer information on all "sold out" selections to controller 25, as will be explained later. The SMC 25 sends a Product Inquiry packet as follows:

Product Inguiry Packet
SMC sends Product Inquiry packet

| SMC | --- | SOH | ---> VIM |
|---|---|---|---|
| SMC | --- | 2 | ---> VIM command code |
| SMC | --- | # | ---> VIM 2-char ASCII slot # |
| SMC | --- | # | ---> VIM |
| SMC | --- | # | ---> VIM ASCII mod 10 check digit |
| SMC | --- | EOT | ---> VIM |

If the packet is received with bad check digit, the VIM notifies the SMC.
  SMC←NAK --- VIM
The SMC then retransmits the Product Inquiry packet. However, if the packet received is OK, but the inquiry corresponds to an invalid slot number or unprogrammed slot, the SMC is notified.
  SMC←DLE --- VIM
Finally, if the packet is received, the inquiry for each slot is processed and the VIM can then notify the SMC of all "sold out" selections (one packet sent for each selection).

| SMC | <--- | STX | --- VIM |
|---|---|---|---|
| SMC | <--- | # | --- VIM 8-char ASCII product description |
| SMC | <--- | # | --- VIM |
| SMC | <--- | # | --- VIM |
| SMC | <--- | # | --- VIM |
| SMC | <--- | # | --- VIM |
| SMC | <--- | # | --- VIM |
| SMC | <--- | # | --- VIM |
| SMC | <--- | # | --- VIM |
| SMC | <--- | # | --- VIM ASCII mod 10 check digit |
| SMC | <--- | ETX | --- VIM | wherein STX has a hex value of $02 and a decimal value of 2, and ETX has a hex value of $03 and a decimal value of 3.

In step 137, as shown in FIG. 9, the keypad controller 39 then maintains selection button activation to provide for a number of selections equal to the stored quantity, the stored quantity being the number of soft drinks derived from the input 5 digit credit code number. Each time a selection button is activated by a customer, the keypad controller 39 decrements the stored quantity, and could optionally display this decremented quantity value in a display area 55.

In step 139, the VIM of keypad controller 39 detects an input selection, upon the customer pressing one of the selection buttons 40 for example, and dispensing section 42 is controlled to dispense the selected soft drink in a manner well known to those of ordinary skill in the art. In step 141, the VIM of keypad controller 39 monitors the number of soft drinks selected, in comparison to the stored quantity of soft drinks derived from the input 5 digit credit code number. In other words, the VIM of keypad controller 39 decrements the quantity of selections remaining until a number of selections made equals the stored quantity. Until this occurs, the keypad controller 39 returns to step 135 of FIG. 9 upon receiving indication of a selection being dispensed, until the number of selections made equals the stored quantity.

It is the VIM of keypad controller 39 that tabulates credit (based upon the stored quantity within the input 5 digit credit code) and debit (each time a user makes a selection) information. If a selection is in stock, i.e. the selected soft drink can be dispensed, then the vend is a success. The VIM decrements the quantity (which can then be displayed) or credit value, and increments the debit quantity value. A debit quantity value can be generated and stored, and when combined with prestored price information, a total debit can be calculated. Further, if a selected item is "sold out", this is a vend failure and no change regarding the debit and credit quantities takes place. Also, if there is an error and an item is not properly vended, no change in debit/credit quantities occurs.

If the number of selections equal the stored quantity, the keypad controller 39 then moves to step 143 wherein the keypad controller 39 transmits a total debit amount to controller 25 and deactivates the selection buttons 40 and awaits another code number from controller 25. It should be repeated that the keypad controller 39 only acts in response to polling from controller 25. Thus, controller 25 sends the "Poll Transaction" packet and keypad controller 39 will reply with a "still in progress" message until the credit quantity equals zero. Then, upon a subsequent polling, the keypad controller 39 responds to indicate "Transaction Complete" as follows:
Transaction Complete Packet
Packet received, transaction has been completed.

| SMC | <--- | STX | --- VIM |
|---|---|---|---|
| SMC | <--- | # | --- VIM 2-char ASCII # of nickels to debit |
| SMC | <--- | # | --- VIM |
| SMC | <--- | # | --- VIM 2-char ASCII # of nickels to credit |
| SMC | <--- | # | --- VIM |
| SMC | <--- | # | --- VIM ASCII mod 10 check digit |
| SMC | <--- | ETX | --- VIM |

The SMC then marks the transaction as closed.
The SMC then completes the credit card transaction.
The keypad controller 39 can also display a quantity of zero in display area 55 as shown in FIGS. 5A and 6A or can turn the green light out for example, for either of the manual input or machine readable input modes. Still further, the vending machine 3 could also display a message in display area 55, requesting a user to input the appropriate coin or paper money amount if additional soft drinks wish to be purchased.
The SMC 25 then sends an "End Transmission" packet to VIM of keypad controller 39.
End Transaction Packet
The SMC sends an End Transaction packet as follows:

| SMC | --- | SOH | ---> VIM |
|---|---|---|---|
| SMC | --- | 9 | ---> VIM command code |
| SMC | --- | # | ---> VIM 2-char ASCII |
| SMC | --- | # | ---> VIM transaction # |
| SMC | --- | # | ---> VIM ASCII mod 10 check digit |
| SMC | --- | EOT | ---> VIM |

If the packet received is OK, the transaction is closed:
  SMC←ACK --- VIM
The VIM then deletes the memory structure for that transaction. However, if the packet is received with a bad check digit:
  SMC←NAK --- VIM
The SMC then retransmits the End Transaction packet. Finally, if the packet received is OK, and the transaction still in progress:
  SMC←DLE --- VIM
To properly terminate, the SMC must poll for an end of transaction and then the SMC must resend and End Transaction packet.

In some instances, a transaction may be cancelled. The "Cancel Transaction" packet is as follows:
Cancel Transaction Packet
The SMC 25 sends a Cancel Transaction packet.

| SMC | --- | SOH | ---> VIM |
| --- | --- | --- | --- |
| SMC | --- | 8 | ---> VIM command code |
| SMC | --- | # | ---> VIM 2-char ASCII transaction # |
| SMC | --- | # | ---> VIM |
| SMC | --- | # | ---> VIM ASCII mod 10 check digit |
| SMC | --- | EOT | ---> VIM |

If the packet received is OK, the transaction is closed.
SMC←ACK --- VIM
The VIM deletes the memory structure for that transaction and sends a signal to SMC 25 acknowledging cancellation. However, if the packet is received with a bad check digit:
SMC←NAK --- VIM
The SMC then retransmits the Cancel Transaction packet. Finally, if the packet received is OK, and the transaction is partially executed:
SMC←DLE --- VIM
The VIM marks the transaction as cancelled, but does not delete it. No further vends on this transaction will be allowed. To cancel anyway, the SMC retransmits the Cancel Transaction packet. Further, to get credit/debit amounts for the transaction, the SMC sends a Poll Transaction packet, and then the SMC sends an End Transaction packet to terminate the transaction.

The SMC can obtain both price and quantity (debited amount) from the keypad controller 39. Alternatively, the SMC 39 can inquire into the price of goods to be vended as follows:
The SMC sends a Price Inquiry packet.

| SMC | --- | SOH | ---> VIM |
| --- | --- | --- | --- |
| SMC | --- | 3 | ---> VIM command code |
| SMC | --- | # | ---> VIM 2-char ASCII slot # |
| SMC | --- | # | ---> VIM |
| SMC | --- | # | ---> VIM ASCII mod 10 check digit |
| SMC | --- | EOT | ---> VIM |

If the packet is received with a bad check digit:
SMC←NAK --- VIM
The SMC then retransmits the Price Inquiry packet. However, if the packet received is OK, but corresponds to an invalid slot number or an unprogrammed slot:
SMC←DLE --- VIM
The VIM sends a return signal deleting the inquiry, wherein DLE has a hex value $10 and a decimal value 16. Finally, if the packet received is OK, the inquiry is processed as follows:

| SMC | <--- | STX | --- VIM |
| --- | --- | --- | --- |
| SMC | <--- | # | --- VIM 2-char ASCII # of nickels price |
| SMC | <--- | # | --- VIM |
| SMC | <--- | # | --- VIM ASCII mod 10 check digit |
| SMC | <--- | ETX | --- VIM |

A description of a second embodiment involving automatic dispensing of goods from a second goods dispensing apparatus such as vending machine 3, based solely upon interaction with gas pump 1, will now be described with regard to FIGS. 10–12.

Briefly, a second embodiment of the present application involves the automatic dispensing of canned soft drinks, for example, from a vending machine 3 based solely upon interaction between a customer and the gas pump 1. In this embodiment, a user is prompted to purchase goods from the vending machine 3 via a display at the gas pump 1. When a customer inputs an affirmative response to the aforementioned prompt, the second goods dispensing apparatus or vending machine 3 is then activated. A customer can then be prompted with regard to quantity of canned soft drinks to be purchased, for example. Optionally, for fully automatic vending, the customer could be prompted regarding types of soft drinks to be purchased.

The vending machine can thus automatically be credited with a quantity of soft drinks, and the user need only make his selections). Optionally, the particular selections or types can be selected at the pump 1 and can be vended in a sequential fashion, either prior to a customer pumping his gas, after a customer has pumped his gas, or both prior to and subsequent to a customer pumping his gas (i.e. a customer is prompted to purchase goods from the vending machine both prior to his pumping gas and then after the pumping gas is finished). Thus, utilizing this automatic second embodiment of the present application, a user need not enter a particular code or coded receipt into the vending machine in order to receive dispensed canned soft drinks from the vending machine.

Figure 10A:
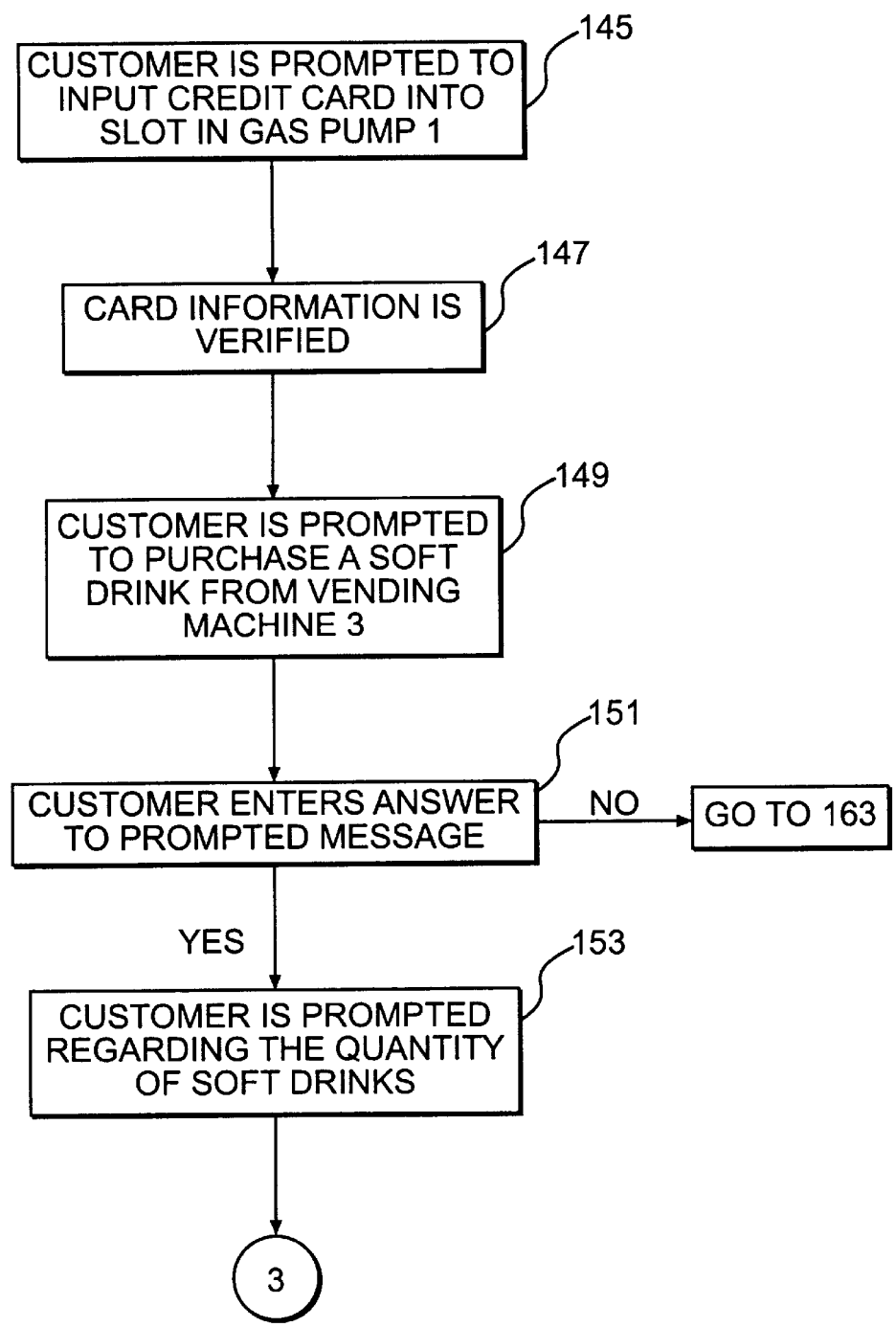
FIGS. 10A and 10B are flow charts illustrating customer interaction in conjunction with a method and apparatus of a second embodiment of the present application.

More specifically, the second embodiment of the present application will be discussed with regard to FIGS. 10–12, FIGS. 10A and 10B describing the second embodiment from the viewpoint of a customer; FIGS. 11A and 11B describing the second embodiment from the viewpoint of the controller 25; and FIG. 12 describing the second embodiment of the present application from the viewpoint of the keypad controller 39, housed within the vending machine 3 for example. It should be noted that protocol similar to that previously used is applicable to this embodiment and will not be repeated for the sake of brevity.

As shown in FIG. 11A, in step 169, a controller 25 initially controls the display 7 to display a prompt requesting credit card input. This is displayed on the fuel dispensing pump or first goods dispensing apparatus 1 as is shown in FIG. 3. From the viewpoint of the customer, the customer is prompted to input his credit card into card reader 5 in a slot in gas pump 1 as is shown with regard to step 145 of FIG. 10A.

In step 171 of FIG. 11A, the controller 25 obtains credit card information from the card reader 5. Authorization is requested via telephone line 35 to the credit card authorization center in a manner well-known to those of ordinary skill in the art. The authorization is checked in step 173 of FIG. 11A. If authorization is not received, a customer message will appear in display 7 of pump 1 as is shown in step 175 of FIG. 10A. This customer message will convey to the user that the card has not been accepted and will further convey to the user that the pump has not been activated at this time. The user can either use an alternate method of payment, can insert a new credit card, or can leave the fuel dispensing facility.

From the viewpoint of the customer, the customer merely awaits card information verification in step 147, which is obtained via controller 25 as previously described with regard to FIG. 11A.

Upon the appropriate authorization being received the controller 25 then moves to step 179 as shown in FIG. 11A. In step 179, the controller 25 controls display 7 to display a message prompting the customer to purchase a soft drink from vending machine 3 for example, which is proximately located to gas pump 1. For instance, a message such as "Would you like to purchase an ice cold soft drink from Coca-Cola? YES NO" is displayed on display area 7 of pump 1. From the customer's point of view, as is shown in step 149 of FIG. 10A, the customer views this displayed information which prompts him to purchase a soft drink from vending machine 3.

As is shown in FIG. 11A, the controller 25 then moves to step 181 and awaits the customer's answer to the inquiry of whether or not he would like to purchase a soft drink from the proximately located vending machine 3. If the customer does not wish to purchase a soft drink, the controller 25, in step 183, then moves to step 199 as shown in FIG. 11B, to allow the customer to pump gas via this credit card transaction in a manner well known to those of ordinary skill in the art. From the customer's point of view, the customer merely enters an answer to the prompted message, by hitting a YES or NO button located on keypad 15 for example, or by hitting a number of a letter representing YES or NO, such as a Y for YES or an N for NO for example. If a customer does not wish to purchase a soft drink, the flow chart in FIG. 10A moves to step 163 of FIG. 10B wherein the customer is prompted to begin pumping gas via his credit card transaction in a manner well known to those of ordinary skill in the art.

If the customer indicates that he would like to purchase a soft drink or other packaged goods from vending machine 3, the controller 25 temporarily stores this positive or affirmative response in step 185 of FIG. 11A. This response can be stored in a type of RAM of controller 25.

Further, in step 185, controller 25 also sends an activation signal or start-of-transmission type signal to keypad controller 39 of the vending machine 3, indicating that more information is forthcoming in response to the affirmative input to the question in step 181. Thus, when controller 25 realizes that a customer desires a soft drink, it notifies keypad controller 39 so that keypad controller 39 can activate the vending machine in anticipation of further information regarding operation of the vending machine 3. Keypad controller 39 then awaits further information from controller 25 regarding the quantity and/or type of soft drink desired by the customer. Depending on the type of transmission channel utilized (i.e. wire, RF, IR), appropriate start-of-transmission signals, as known to those of ordinary skill in the art, can be selected, along with proper necessary protocol signals.

Controller 25, in step 187 of FIG. 11A, then controls display 7 to display a message prompting the customer to input a desired quantity of soft drinks via keypad 15. In other words, from the customer's point of view, the customer is prompted regarding the quantity of soft drinks in step 153 as shown in FIG. 10A. A message such as "How many soft drinks would you like? Please enter number of keypad" could be such a display prompting the customer regarding the quantity of soft drinks desired.

Figure 10B:
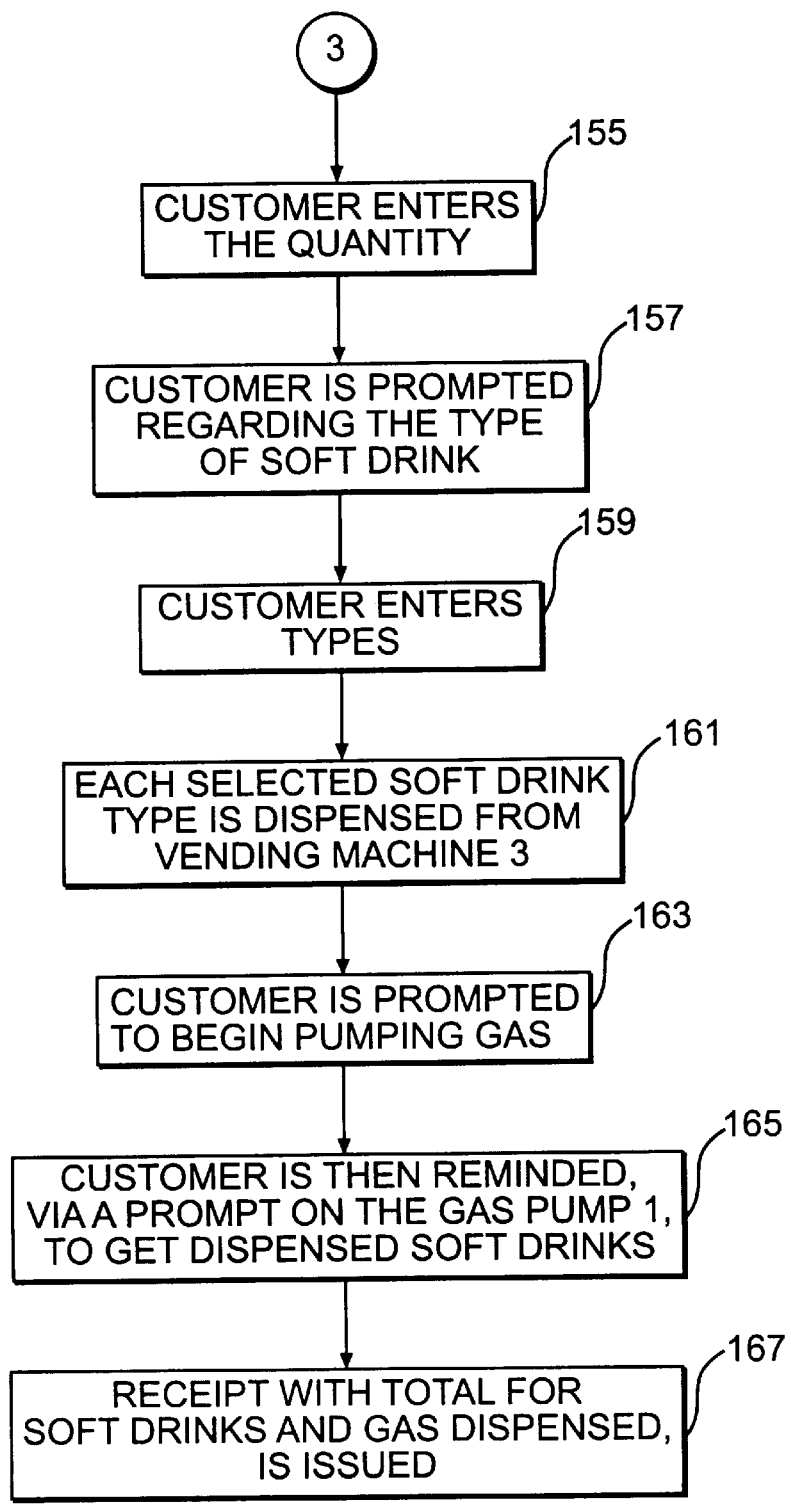
Figure 11A:
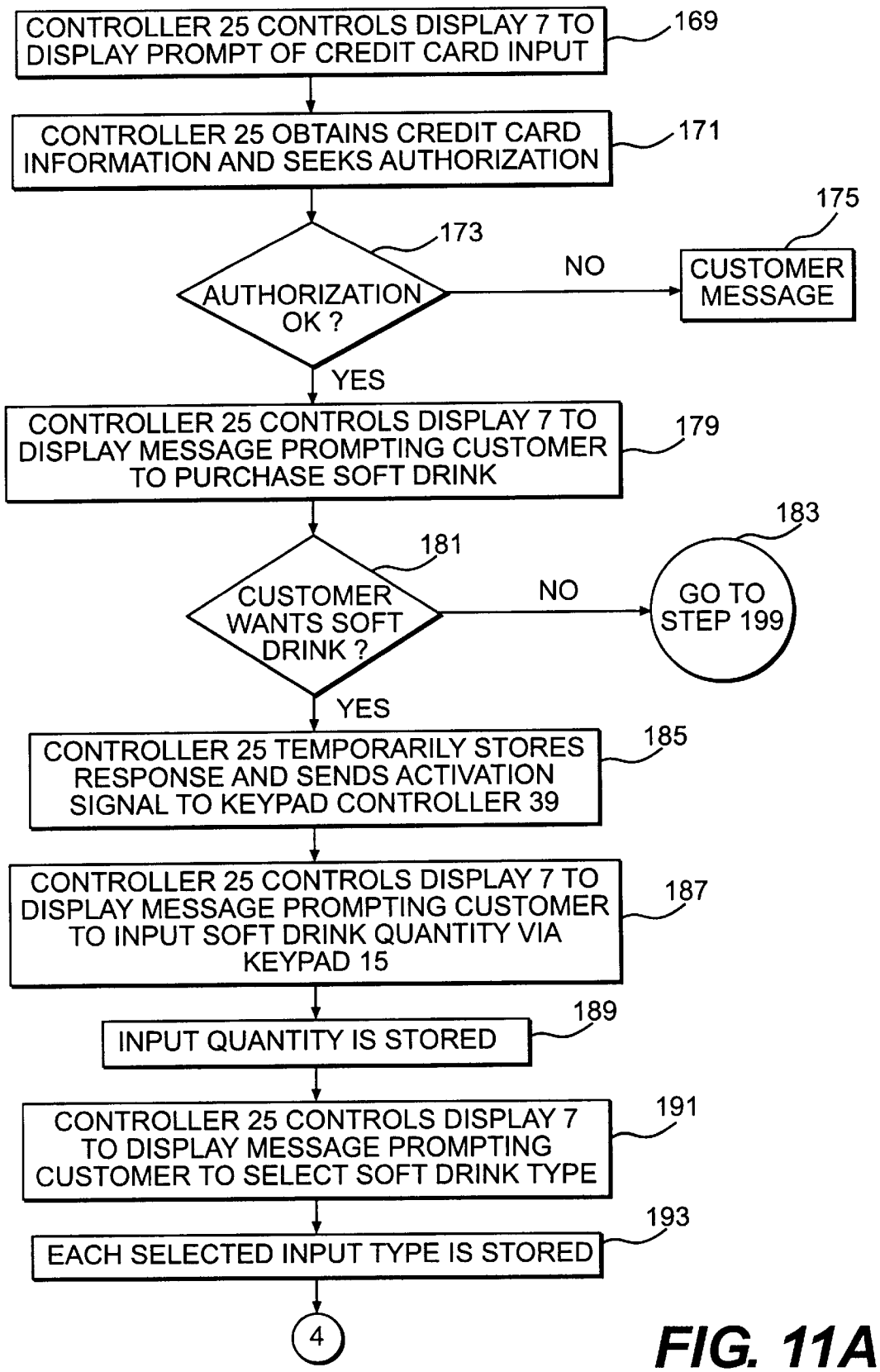
FIGS. 11A and 11B illustrate operations occurring in a fuel dispensing apparatus 1 in conjunction with a method and apparatus of a second embodiment of the present application.
Figure 11B:
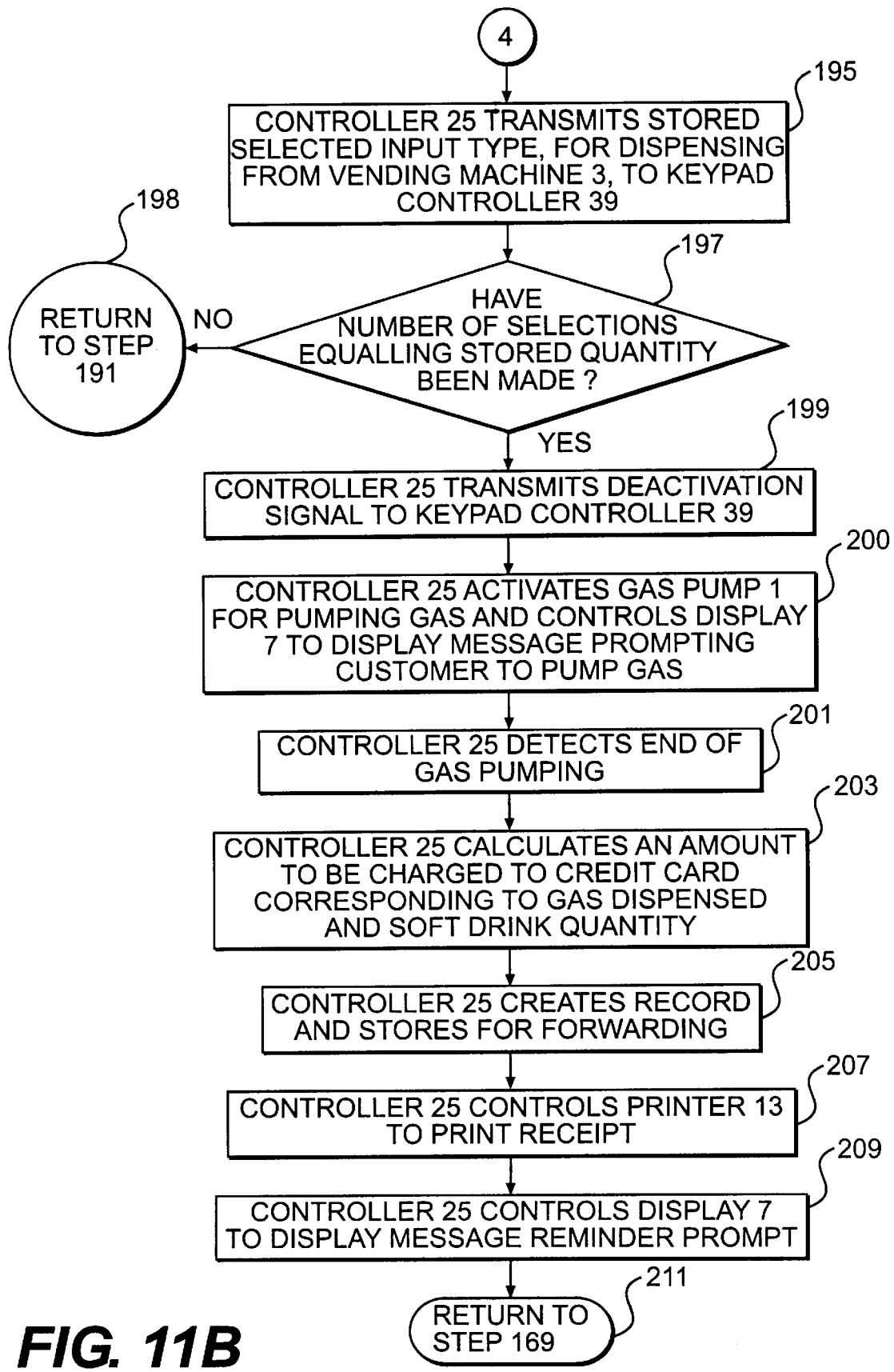

In step 155 of FIG. 10B, the customer can then enter the desired quantity of soft drinks through keypad 15. The input quantity is then stored by controller 25 in step 189 of FIG. 11A, in RAM for example.

In step 191 of FIG. 11A, controller 25 then optionally controls display 7 to display a message prompting a customer to select a soft drink type. The controller 25 could, in one preferred embodiment, scroll each of the various selections so that a user need only hit an enter button on keypad 15 to input the selection. Preferably, however, the controller 25 controls display 7 to display each of the various selectable items in vending machine 3 with a corresponding numeral, so that a customer need only enter a particular numerical value such as a 1, 2, or 3 for example, to select a soft drink type. From the customer's viewpoint, in step 157 of FIG. 10B, the customer is prompted regarding the type of soft drink and is further provided with a prompt indicating how a selection could be made. A message such as "Please select a desired available soft drink from the following list, and enter the corresponding number on keypad. Coca-Cola—1, Sprite—2, Diet Coke—3, and Diet Sprite—4."

In a further preferred embodiment, the controller 25 polls keypad controller 39 prior to step 191. The keypad controller 39 then transmits to controller 25, a message indicating a particular type of soft drink is unavailable or is "sold out" as previously described. The keypad controller 39 detects that a particular soft drink type is "sold out" from dispensing section 42, in a manner well-known to those skilled in the art, and when polled, transmits this "sold out" information for a given soft drink type through line 33 to the retail controller 25. Upon the retail controller 25 receiving such a message from keypad controller 39, the controller 25 then controls display 7 so that a particular soft drink type is not displayed on display 7 subsequent to the message prompting the customer to select soft drink type in step 191. Alternatively, keypad controller 39 can continuously monitor dispensing section 42 and can receive a signal indicating a type of soft drink is "sold out" in a manner well known to those skilled in the art. Then, upon keypad controller 39 receiving such a "sold out" signal indicating which type of soft drink is "sold out", this can be transmitted upon keypad controller 39 being polled by controller 25. Thereafter controller 25 can inhibit display selection of that type of soft drink.

In step 193 of FIG. 11A, each selected input type is then stored in RAM for example. This information can then be encoded, in a manner similar to that previously described with regard to code/quantity encodation for example. In step 195, as is shown in FIG. 11B, controller 25 then transmits the stored information corresponding to the selected input type, to allow for dispensing from vending machine 3, to keypad controller 39. Generation and transmission of a signal indicative of a selected type of soft drink is dependent upon the type of transmission medium utilized, i.e. IR, RF, wire, etc. Accordingly, as long as both the memories of keypad controller 39 and controller 25 have been preprogrammed with similar table or equation information, proper encoding and decoding of transmitted information can take place, as is well known to those skilled in the art.

Alternatively or additionally, the stored quantity of step 189 could be sent to keypad controller 39 for use in vending machine 3. This could be stored and displayed as a credit quantity of goods, awaiting further user selection. If sent in addition to selected input type, the stored quantity of step 189 would be transmitted to keypad controller 39 prior to step 191.

The keypad controller 39, as will be described subsequently with regard to FIG. 12, then receives this signal, decodes it based upon information prestored in ROM for example, and either signals dispensing section 42 to dispense the selected soft drink in step 217 of FIG. 12 or credits the appropriate quantity and awaits user selection. From the customer's point of view, the customer merely views the selected soft drink type as it is dispensed from vending machine 3 in step 161.

In step 197, the controller 25 compares the number of selections made to the stored quantity in RAM. If the number of selections made does not equal the quantity stored, the controller 25 can then return to step 191 of FIG. 11A and again display a message prompting the customer to select a particular type of soft drink, along with the scrolled selections or selections displayable with an associated numerical input value. Once the number of selections have been made which equal the stored quantity, FIG. 11B then moves to step 199. Alternatively, the quantity and/or types of soft drinks selected can be encoded and batch processed by controller 25, sent to keypad controller 39, and decoded and used to sequentially output selected types from vending machine 3.

In step 199, controller 25 then transmits a deactivation signal or end-of-transmission type signal to keypad controller 39, in the same manner as that previously described regarding embodiment one, indicating that no more information is forthcoming regarding the current transaction. Depending on the type of transmission channel utilized (i.e. wire, RF, IR), appropriate end-of-transmission protocol signals, as known to those of ordinary skill in the art, can be selected, along with additional protocol responsive signals if necessary. Subsequently, the customer is prompted to begin pumping gas in step 163 of FIG. 10B. This occurs, as shown in FIG. 11B, in step 200 where the controller 25 activates gas pump 1 for pumping gas and controls display 7 to display a message prompting the customer to pump gas. A message such as "Remove nozzle, lift handle, and begin pumping. Replace nozzle when finished." is displayed on display 7. In actuality, the message prompting the customer to pump gas is displayed initially on display 7, and upon the customer removing nozzle 19 and lifting handle or lever 21, then controller 25 activates gas pump 1 for pumping gas. Controller 25, as previously explained, is connected in a manner well known to those of ordinary skill in the art so as to detect the lifting of the handle or lever 21 so that it can subsequently send a signal via line 31 to pump 1 to activate gas pump 1 for pumping gas.

In step 201 of FIG. 11B, the controller 25 then detects the end of gas pumping, in a manner well known to those of ordinary skill in the art, upon detecting that the user has lowered handle or lever 21, and has replaced gas nozzle 19 to the position shown in FIG. 3 of the present application for example. The controller 25, either during the pumping of the gas or subsequent to the detection of the end of gas pumping in step 201, then calculates an amount to be charged to the customer's credit card in step 203. This amount to be charged corresponds not only to the gas dispensed, which is calculated based upon the number of gallons pumped and the prestored price per gallon, but also includes a charge for the quantity of soft drinks actually vended, which were dispensed via vending machine 3 in step 161 of FIG. 10B for example or which are dispensed via subsequent activation of selection buttons 40 by a customer. The store quantity is utilized, with a prestored or polled price per can or unit of packaged goods, to calculate an amount to be charged on the credit card in step 203.

FIG. 11B then moves to step 205 where the controller 25 creates a record and stores this record for forwarding in a well-known manner. The controller 25 subsequently, at a later time, sends a batch of records or files to the credit card company, so that the customer's account will be debited for an amount corresponding to the gas dispensed and canned soft drinks dispensed, and the retailer's account will be credited accordingly. In step 207, the controller then controls printer 13 to print a receipt somewhat similar to that shown with regard to elements 45A and 45B of FIGS. 5B and 6B. However, this receipt includes the total price for gas dispensed and soft drinks dispensed from vending machine 3, but does not include any type of code number in area 47A or 47B as shown in FIGS. 5B and 6B, respectively. This is because no user input of a code is necessary in the second embodiment of the present application.

Finally, in step 209, the controller 25 then controls display 7 to display reminder message prompt to the customer. From the customer's point of view, as is shown in step 165 of FIG. 10B, the customer is actually reminded, via a prompt displayed on the gas pump 1, to pick up his soft drinks dispensed from vending machine 3. A message such as "Thank you for your business. Please pick up and enjoy your dispensed Coca-Cola product from the Coke vending machine." can be displayed on display 7. Thus, from the customer's viewpoint, a receipt for the total cost of soft drinks and gas dispensed is issued in step 167 of FIG. 10B. Thus, a single receipt indicating payment of both soft drinks and gas dispensed is issued to a customer, thereby alleviating any need for the customer to insert separate change or paper money into the Coke machine 3, to purchase any desired soft drinks. The controller 25, upon the user taking his receipt from printer 13, then controls display 7 to again display a prompt requesting input of a credit card by a user as shown in step 169 of FIG. 11B for example. In other words, in step 211, the controller 25 returns to step 169 of FIG. 11A.

Figure 12:
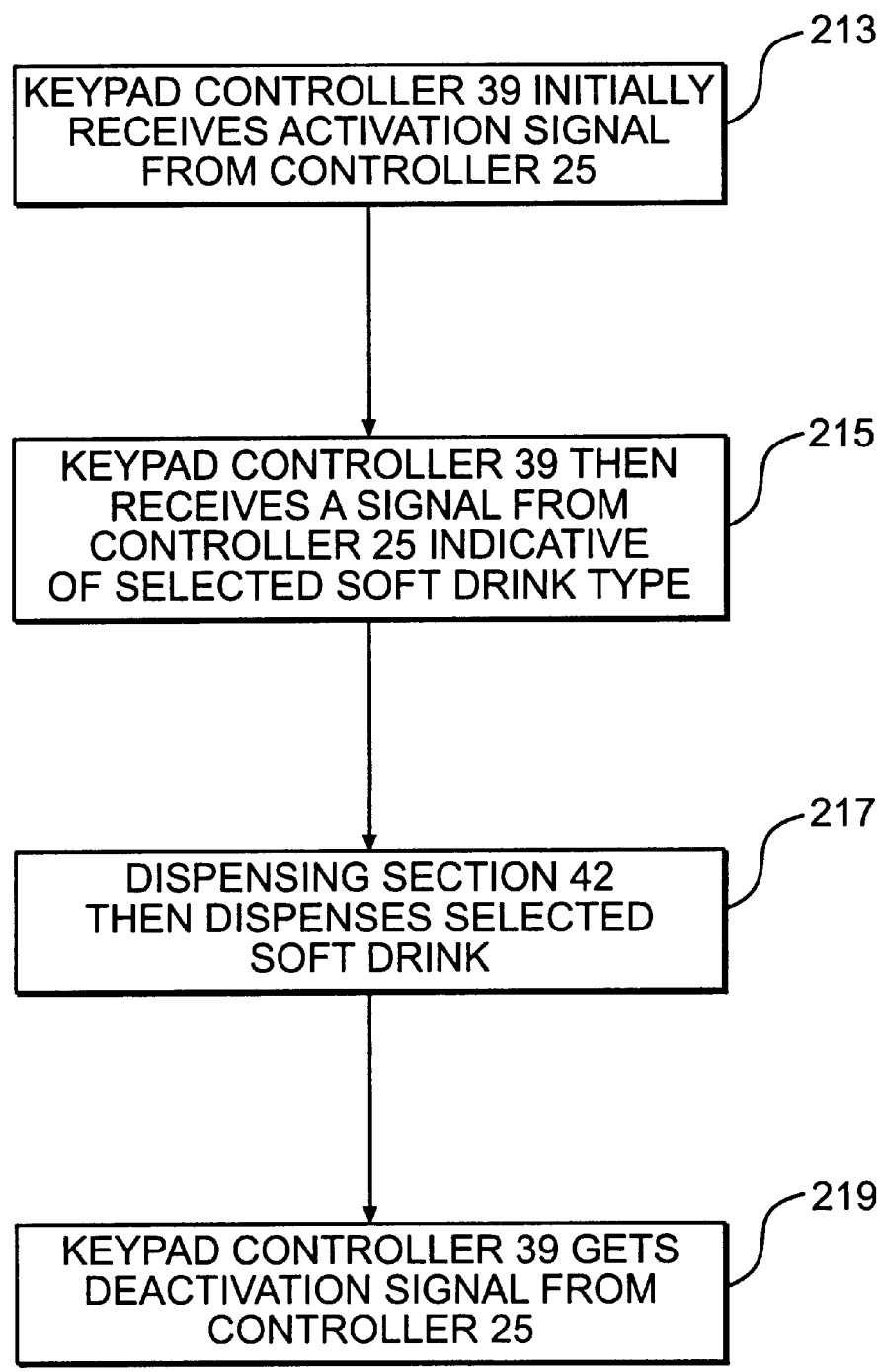
FIG. 12 illustrates operations occurring within a soft drink dispensing apparatus in conjunction with a method and apparatus of a second embodiment of the present application.

As previously stated with regard to FIG. 12 of the present application, in step 213, the keypad controller 39 of the vending machine 3 initially receives an activation or start-of-transmission signal from controller 25 and follows with a responsive protocol signal. Keypad controller 39 can then receive a signal from controller 25 indicative of a selected soft drink type in step 215. The keypad controller 39 then controls dispensing section 42 to dispense the selected soft drink in step 217.

The keypad controller 39 can then repeat steps 215 and 217 for each signal received from controller 25, indicative of a particular selected soft drink type, the number of repeats of steps 215 and 217 corresponding to the quantity of soft drinks purchased by the customer. Finally, in step 219, the keypad controller 39 receives a deactivation or end-of-transmission signal from controller 25. It should be noted that while quantity information can be transmitted to keypad controller 39, it need not be since it is controller 25 which calculates price based on quantity.

The various preferred embodiments of the present application are not limited by the disclosure, and can be varied in many ways and will be recognized by those of ordinary skill in the art. For example, in the second embodiment of the present application, the second embodiment may be only semi-automatic and not completely automatic. In other words, instead of prompting a customer to select a soft drink type in step 191 of FIG. 11A, only quantity of soft drinks may be inputted via the display prompt in 187 and the storage of input quantity in step 189 of FIG. 11A. Then, the stored quantity may be transmitted from controller 25 to keypad controller 39 in step 195.

If this occurs, keypad controller 39 would then receive a signal indicative of a quantity of soft drinks to be purchased. The customer would still be billed for this same quantity in the manner previously described with regard to FIGS. 11A and 11B. However, instead of automatically dispensing each of these selected types of soft drinks, the keypad controller 39 could then activate the selection buttons 40 (in a manner previously described regarding the non-automatic first embodiment), thereby prompting the user to subsequently make his own selection of a variety of types of soft drinks or flavors of soft drinks by hitting the appropriate selection button 40. The selection buttons 40 could be lit up for example, upon keypad controller 39 receiving the aforementioned quantity signal from controller 25, or separate display lights could be activated next to each of the selection buttons. The keypad controller 39 could also monitor, via dispensing section 42, the number of cans or packaged goods remaining in the machine 3, which correspond to each of the selection buttons 40. Upon detecting that a particular selection or type of soft drink was unavailable, since no more of that soft drink remained in the machine 3, only available selection or selection buttons could be activated and thus not activate selection buttons 40 corresponding to "sold out" products.

Subsequently, selection button activation could be maintained to provide for a number of selections equal to the stored quantity information, stored in RAM for example, the stored quantity being the number of soft drinks selected by a customer and transmitted to keypad controller 39 from controller 25. Alternatively, each time a selection button was activated by a customer, the keypad controller 39 could then decrement the stored quantity, and display this decremented quantity value in a display area such as display area 55 shown in FIG. 5A or 6A for example.

Subsequently, an input selection could be detected upon the customer pressing one of the selection buttons 40 for example, and the dispensing section 42 could be controlled to dispense the selected soft drink in a manner well known to those of ordinary skill in the art. The keypad controller 39 could then monitor the number of soft drinks selected, in comparison to the stored quantity of soft drinks. If the number of selections made did not equal the stored quantity, the keypad controller 39 could then repeat the process of activating selection buttons 40 until the number of selections made equalled the stored quantity or until the user cancelled the transaction.

Finally, if the number of selections equalled the stored quantity, the keypad controller 39 could transmit the debit information to controller 25 and then await the aforementioned End of Transaction or deactivation signal from controller 25 in step 219 of FIG. 12. Alternatively, the keypad controller 39 could display a quantity of zero in a display area 55 as shown in FIG. 5A or 6A. Still further, the keypad controller 39 could alternatively display a message in display area 55, requesting a user to input the appropriate coin or paper money amount if additional soft drinks are wished to be purchased.

Further, in either the first or second embodiments, prompting by display need not take place at gas pump 1. For example, information directing a customer on how to purchase a soft drink at a vending machine 3 proximately located to the pump 1 can be posted on the gas pump 1 itself. The gas pump 1 and its controller 25 could then receive an input user request for a soft drink (including kind or type) and as previously discussed, could then either control vending machine 3 to dispense an appropriate soft drink or drinks or could print a receipt with an appropriate code. The gas pump 1 would then bill an amount for gasoline and purchased vendable goods on one receipt.

Still further, alternate types of codes, with regard to the inputting of a code which is human readable as shown in FIG. 5B or which is machine readable as shown in FIG. 6B, could be used with regard to the first embodiment of the present application as previously explained. Any type of machine readable code, such as a bar code for example, could be utilized.

As explained with regard to the second embodiment of the present application, a controller 25 could control display 7 to display a message prompting a customer to select a soft drink type. This type of message prompt could also be used in conjunction with the first embodiment of the present application. In other words, controller 25 could control display 7 to display such a message prompt, subsequent to the customer inputting his quantity in step 99 of FIG. 8A for example, and the customer could then select a desired input type of soft drink. Thereafter, in step 101 of FIG. 8A in conjunction with the first embodiment of the present application, a particular code number could be generated based upon not only stored input quantity, but also based upon particular input type(s), merely by adding additional digits for example.

The process could be further repeated until the number of input selections equals the stored quantity information, and then a code number could be generated based upon each of these various selections and the stored quantity in step 101. Alternatively, in step 101, a code number could be generated based upon each separate selection and the particular stored quantity such that when the receipt, including the particular code number, were input into a machine readable code reader 51 as shown in FIG. 6A for example, each of the various selections could be sequentially dispensed to the customer. Alternatively, separate code numbers could be generated, and a customer could input the separate code numbers via keypad 16 into the vending machine 3 as shown in FIG. 5A, for sequential dispensing of the particular selected products, thereby alleviating any need for particular selection switches 40 as shown in FIGS. 5A and 6A. Any of the described encoding techniques could be used, being altered depending on modes of data transmission for example, with a corresponding decoding technique being used at vending machine 3. Similarly, for accessing information corresponding to input quantity and type of soft drink desired, and for transmitting such information from controller 25 to keypad controller 39, any of the described encoding techniques can be used.

Still further, a second prompt may be generated, in either the first embodiment or the second embodiment of the present application, to purchase additional goods or additional soft drinks. For example, in the automatic mode as described with regard to FIGS. 10–12, a message prompting a user to purchase soft drinks could be displayed before the pumping of the gas, and the soft drinks could actually be dispensed prior to the pumping of the gas. Then, once gas pumping has been completed, a second prompt could appear, repeating step 179 for example, requesting a user to again purchase additional soft drinks. This is because a user may desire a soft drink which he can drink while pumping his gas, and if he finishes that soft drink, he may desire another soft drink after he has finished pumping the gas.

It should be understood from the various descriptions of the embodiments made herein, that the dispensing of canned soft drinks is merely one use for the method and apparatus of the present application. The machine 3 can be a vending machine which can dispense other types of goods such as candy, cigarettes, etc. Further, the machine 3 can output goods of varying prices, wherein the price information need only be tied to particular goods in a manner well known to those of ordinary skill in the art, and transmitted to and stored in the memory of either one or both of controllers 25 and 39.

Further, the input device such as keypad 16 or code reader 51 can be varied in connection with the present application. The device can be a credit card reader similar to credit card reader 5 of the gas pump. In this case, when the controller 25 obtains a appropriate authorization of the credit card, the controller 25 can transfer this information to keypad controller 39 of the vending machine 3.

Subsequently, the controller 25 can control display 7 to display a message prompting a customer to purchase a soft drink, and further prompting the customer to merely insert the same credit card into a credit card reader 5 of vending machine 3. The vending machine 3 can then read the credit card, compare its information to the already authorized information transmitted from controller 25, and can then prompt the user to select a desired soft drink. Once the user has finished selecting soft drinks, the controller 29 can then total the quantity of soft drinks purchased, and can transmit this information back to controller 25. Controller 25 can then calculate an amount to be charged to the credit card corresponding to the gas dispensed and the soft drink quantity purchased and thereby can issue a receipt which includes a total price for both the gas dispensed and the soft drinks dispensed.

As previously described, in either embodiment one or two, the VIM of keypad controller 39 monitors the debit/credit quantity. While the keypad controller 39 normally transmits a debit amount to controller 25 at the end of a transaction, it can also transmit a credit quantity or price total. For example, if credits remain at the time transactions are complete, or if a customer inputs coins or dollars into vending machine 3, a credit quantity total can be transmitted by the keypad controller 39 to controller 25. This could occur if the customer wanted his change to be credited to his subsequent gasoline purchase or if the customer wanted an entire amount to be credited to his gasoline purchase, for example. Thus, if a user wished to purchase only $1.00 of gasoline (for a lawnmower for example), the user could input his card in the pump; be prompted to purchase a drink; input a dollar into vending machine 3; hit the "coin return" button to cancel the vend transaction for example; and receive credit for the gasoline sale in the form of $1.00. This is only exemplary of the fact that both credit and debit information can be sent from vending machine 3 to gas pump 1, but should provide a good example regarding the range of equivalents which the claims of the present application are entitled.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of dispensing goods, comprising the steps of:
   (a) reading a credit card at a first goods dispensing apparatus;
   (b) prompting, at the first goods dispensing apparatus, a user to purchase second goods from a second goods dispensing apparatus, separate from the first goods dispensing apparatus;
   (c) receiving, at the first goods dispensing apparatus, a user selected response to the prompt to determine if a purchase of second goods from the second goods dispensing apparatus has been requested by the user;
   (d) activating the first goods dispensing apparatus for dispensing of first goods, the first goods being different from the second goods;
   (e) generating a code in response to receipt of a user selected response in step (c) indicative of a request to purchase second goods;
   (f) billing an amount for the dispensed first goods and the purchased second goods, if any requested, to the credit card; and
   (g) printing and outputting a receipt of the billed amount, at the first goods dispensing apparatus, wherein the receipt includes the generated code which is usable for dispensing the second goods from the second goods dispensing apparatus, if any have been requested by the user.

2. The method of claim 1, wherein the code is generated in step (e) based, in part, upon information related to the second goods requested by the user.

3. The method of claim 1, wherein the code of the receipt printed in step (g) is machine readable.

4. The method of claim 1, wherein the code of the receipt printed and output in step (g) is human readable.

5. The method of claim 1, further comprising the step of:
   (h) prompting a user to select a quantity of second goods to be purchased from the second goods dispensing apparatus, if any requested in step (c).

6. The method of claim 5, wherein the code is generated, in part, based upon the selected quantity of second goods of step (h).

7. The method of claim 6, wherein the code of the receipt printed and output in step (g) is machine readable.

8. The method of claim 6, wherein the code of the receipt printed and output in step (g) is human readable.

9. The method of claim 7, wherein the receipt printed and output in step (g) containing the machine readable code, is insertable in the second goods dispensing apparatus, for securing the selected quantity of purchased second goods.

10. The method of claim 1, further comprising the step of:
    (h) prompting a user, and receiving a user selected response in response thereto, to purchase additional second goods from the second goods dispensing apparatus subsequent to step (d) and prior to step (f), wherein the billed amount of step (f) if is for the dispensed first goods, purchased second goods, if any requested, and additionally purchased second goods, if any requested.

11. The method of claim 1, further comprising the step of:
    (g) attempting to secure approval of the credit card immediately after the credit card is read in step (a), wherein steps (b)–(f) are skipped, upon failing to secure approval in step (g).

12. The method of claim 1, further comprising the step of:
    (h) storing the received user selected response of step (c).

13. The method of claim 5, further comprising the step of:
    (i) storing the received user selected response of step (c), wherein the prompt of step (h) is skipped if the stored user selected response is not indicative of a user requesting the purchase of second goods from the second goods dispensing apparatus.

14. The method of claim 13, further comprising the step of:
    (j) storing a user selected quantity in response to the prompt of step (h).

15. The method of claim 2, further comprising the step of:
    (h) prompting a user to enter a code number, to be printed on a receipt in step (g), into the second goods dispensing apparatus.

16. The method of claim 3, further comprising the step of:
    (h) prompting a user to insert a machine readable receipt, to be printed and output in step (g), into the second goods dispensing apparatus.

17. The method of claim 6, further comprising the step of:
    (i) prompting a user to enter a code number, to be printed and output in step (g), into the second goods dispensing apparatus.

18. The method of claim 7, further comprising the step of:
(i) prompting a user to insert a machine readable receipt, to be printed in step (g), into the second goods dispensing apparatus.

19. A method of dispensing goods, comprising the steps of:
(a) reading a credit card at a first goods dispensing apparatus;
(b) prompting, at the first goods dispensing apparatus, a user to purchase second goods from a second goods dispensing apparatus, separate from the first goods dispensing apparatus;
(c) receiving from the first goods dispensing apparatus, a user selected response to the prompt to determine if a purchase of second goods from the second goods dispensing apparatus has been requested by the user;
(d) generating a code in response to receipt of a user selected response received in step (c) indicative of a request to purchase second goods;
(e) activating the second goods dispensing apparatus for dispensing the purchased second goods, if any requested, in response to receipt of the code generated in step (d);
(f) activating the first goods dispensing apparatus for dispensing of first goods, the first goods being different from the second goods; and
(g) billing an amount for the dispensed first goods and the purchased second goods, if any requested, to the credit card.

20. The method of claim 19, further comprising the step of:
(h) prompting, at the first goods dispensing apparatus, a user to select a quantity of second goods to be purchased from the second goods dispensing apparatus, if any requested in step (c), wherein the billed amount of step (g) includes an amount for the dispensed first goods and an amount for the selected quantity of second goods, if any requested.

21. The method of claim 20, further comprising the step of:
(i) prompting, at the first goods dispensing apparatus, a user to select a type of second goods to be purchased from the second goods dispensing apparatus, if any requested in step (c).

22. The method of claim 21, wherein step (i) is repeated, at most, a number of times equal in number to the quantity selected in response to the prompt of step (h).

23. The method of claim 21, further comprising the step of:
(j) instructing the second goods dispensing apparatus to automatically dispense the selected types and quantities of second goods in accordance with responses to the prompts of steps (h) and (i).

24. The method of claim 22, further comprising the step of:
(j) instructing the second goods dispensing apparatus, for each selected in response to the prompt of step (i), to automatically dispense each selected second goods from the second goods dispensing apparatus.

25. The method of claim 23, further comprising the step of:
(k) printing and outputting a single receipt of the billed amount for the dispensed first goods and the dispensed second goods, if any requested, at the first goods dispensing apparatus.

26. The method of claim 24, further comprising the step of:
(k) printing and outputting a single receipt of the billed amount for the dispensed first goods and the dispensed second goods, if any requested, at the first goods dispensing apparatus.

27. The method of claim 19, further comprising the step of:
(h) prompting a user, and receiving a user selected response in response thereto, to purchase additional second goods from the second goods dispensing apparatus subsequent to step (f) and prior to step (g), wherein the billed amount of step (g) is for the dispensed first goods, purchased second goods, if any requested, and additionally purchased second goods, if any requested.

28. The method of claim 19, further comprising the step of:
(h) attempting to secure approval of the credit card immediately after the credit card is read in step (a), wherein the steps (b)–(g) are skipped upon failing to secure approval in step (h).

29. The method of claim 19, further comprising the step of:
(h) storing the received user selected response of step (c).

30. The method of claim 20, further comprising the step of:
(i) storing the user selected response of step (c), wherein the prompt of step (h) is skipped if the stored user selected response is not indicative of a user requesting the purchase of second goods from the second goods dispensing apparatus.

31. The method of claim 30, further comprising the step of:
(j) storing a user selected quantity in response to the prompt of step (h).

32. The method of claim 31, further comprising the step of:
(k) prompting, at the first goods dispensing apparatus, a user to select a type of second goods to be purchased from the second goods dispensing apparatus, if any requested in step (c); and
(l) storing a user selected type of second goods in response to step (k).

33. The method of claim 32, wherein step (k) is repeated, at most, a number of times equal in number to the quantity selected in response to the prompt of step (h).

34. The method of claim 21, wherein the prompting of step (i) is a prompting of types of second goods, each with a corresponding input number, available for purchase from the second goods dispensing apparatus.

35. The method of claim 34, wherein the prompting of step (i) excludes all types of goods soldout from the second goods dispensing apparatus.

36. The method of claim 32, wherein the prompting of step (k) is a prompting of types of second goods, each with a corresponding input number, available for purchase from the second goods dispensing apparatus.

37. The method of claim 36, wherein the prompting of step (k) excludes all types of goods soldout from the second goods dispensing apparatus.

38. A goods dispensing apparatus, for use in conjunction with a second goods dispensing apparatus, comprising:
first means for activating and controlling the goods dispensing apparatus in response to receipt of a transmission including a generated code, the code being generated in response to receipt of an input credit card and receipt of an affirmative user response to a prompting of a user to purchase first goods from the goods dispensing apparatus, each of the credit card input, affirmative user response, and prompting occurring at the second goods dispensing apparatus; and second means responsive to the first means, for dispensing purchased first goods from the activated goods dispensing apparatus based upon the generated code, wherein an amount for dispensed second goods from the second goods dispensing apparatus and an amount for the dispensed first goods from the goods dispensing apparatus are billed to the credit card input into the second goods dispensing apparatus, the first goods being different from the second goods.

39. The goods dispensing apparatus of claim 38, wherein the first goods are beverages.

40. The goods dispensing apparatus of claim 38, wherein the first means receives the generated code, which includes an indication of a quantity of first goods to be dispensed by the second means obtained at the second goods dispensing apparatus, in response to the second goods dispensing apparatus prompting a user to select a quantity of first goods to be purchased, the first means subsequently controlling the second means to dispense the received quantity of first goods.

41. The goods dispensing apparatus of claim 40, wherein the code received by the first means further includes, an indication of each user selected type of first goods to be dispensed by the second means obtained at the second goods dispensing apparatus, in response to the second goods dispensing apparatus prompting a user to select a type of first goods to be purchased, the second means subsequently being controlled to dispense each received user selected type of first goods.

42. The goods dispensing apparatus of claim 41, wherein the code received by the first means includes an indication of a user selected type of first goods, at most, a number of times equal in number to the received user selected quantity.

43. The goods dispensing apparatus of claim 42, wherein the second means is controlled to automatically dispense each received user selected type of first goods based upon the generated code.

44. The goods dispensing apparatus of claim 42, wherein an amount for the user selected quantity of first goods is billed to the credit card input into the second goods dispensing apparatus.

45. The goods dispensing apparatus of claim 38, wherein the goods dispensing apparatus is proximately located to the second good dispensing apparatus.

46. The goods dispensing apparatus of claim 41, wherein the first means further transmits an indication, of types of first goods which are unavailable to be dispensed by the second means, to the second dispensing apparatus to thereby exclude the prompting of the unavailable types of first goods at the second dispensing apparatus.

47. The goods dispensing apparatus of claim 38, wherein the transmission from the second goods dispensing apparatus to the goods dispensing apparatus is a radio frequency transmission.

48. The good dispensing apparatus of claim 38, wherein the transmission from the second goods dispensing apparatus to the goods dispensing apparatus is an infrared transmission.

49. The goods dispensing apparatus of claim 38, wherein the transmission is a transmission through a wire connecting the second goods dispensing apparatus and the goods dispensing apparatus.

50. A goods dispensing apparatus, for use in conjunction with a second goods dispensing apparatus, comprising:

activation means for activating the goods dispensing apparatus in response to receipt of a transmission indicating receipt of an input credit card and receipt of an affirmative user response to a prompting of a user to purchase first goods from the goods dispensing apparatus, each of the credit card input, affirmative user response, and prompting occurring at the second goods dispensing apparatus;

input means, operatively connected to the activation means, for receiving an input code subsequent to the goods dispensing apparatus being activated, the input code being a code generated in response to receipt of the affirmative user response to the prompting of a user to purchase first goods; and dispensing means, operatively connected to the input means, for dispensing first goods from the activated goods dispensing apparatus in response to the received input code, wherein an amount for dispensed second goods from the second goods dispensing apparatus and an amount for the dispensed first goods from the goods dispensing apparatus are billed to the credit card input into the second goods dispensing apparatus, the first goods being different from the second goods.

51. The goods dispensing apparatus of claim 50, wherein the input code is based, in part, upon a selected quantity of first goods, the quantity being user selected in response to a prompting at the second goods dispensing apparatus.

52. The goods dispensing apparatus of claim 50, wherein the input code was previously displayed at the second goods dispensing apparatus.

53. The goods dispensing apparatus of claim 50, wherein the input means includes a decoder for decoding machine readable input codes.

54. The goods dispensing apparatus of claim 50, wherein the input means includes a keypad.

55. The goods dispensing apparatus of claim 50, wherein the input code is printed on a receipt, the receipt being issued by the second goods dispensing apparatus, further containing the amounts billed to the credit card.

56. The goods dispensing apparatus of claim 55, wherein the input code is machine readable.

57. The goods dispensing apparatus of claim 55, wherein the input code is human readable.

58. The goods dispensing apparatus of claim 56, wherein the input means includes a decoder for decoding machine readable input codes.

59. The goons dispensing apparatus of claim 58, wherein the input code is based, in part, upon a selected quantity of first goods, the quantity being user selected in response to a prompting at the second goods dispensing apparatus.

60. The goods dispensing apparatus of claim 57, wherein the input means includes a keypad.

61. The goods dispensing apparatus of claim 60, wherein the input code is based, in part, upon a selected quantity of first goods, the quantity being user selected in response to a prompting at the second goods dispensing apparatus.

62. The goods dispensing apparatus of claim 59, wherein the input code further includes a selected type of first goods, the type of first goods being user selected in response to a prompting at the second goods dispensing apparatus.

63. The goods dispensing apparatus of claim 61, wherein the input code further is based, in part, upon a selected type of first goods, the type of first goods being user selected in response to a prompting at the second goods dispensing apparatus.

64. The goods dispensing apparatus of claim 50, wherein the transmission from the second goods dispensing apparatus to the goods dispensing apparatus is a radio frequency transmission.

65. The goods dispensing apparatus of claim 50, wherein the trans mission from the second goods dispensing apparatus to the goods dispensing apparatus is an infrared transmission.

66. The goods dispensing apparatus of claim 50, wherein the transmission is a wire transmission through a wire connecting the second goods dispensing apparatus and the goods dispensing apparatus.

67. The goods dispensing apparatus of claim 50, wherein the input means includes a credit card reader for, upon reading an input credit card identical to the credit card input to the second goods dispensing apparatus, within a predetermined period of time, controlling the dispensing of first goods from the dispensing means.

68. The goods dispensing apparatus of claim 50, wherein the first goods are beverages.

69. The method of claim 1, wherein the first goods dispensing apparatus is a gasoline pump and the second goods dispensing apparatus is a food vending machine.

70. The method of claim 69, wherein said gasoline pump and said food vending machine are in close enough proximity so that each is visible from the other.

71. The method of claim 70, wherein said gasoline pump and said food vending machine are disposed on a common gasoline island area of a gasoline station.

72. The method of claim 70, wherein said gasoline pump and said food vending machine are both disposed outside of an associated service station building.

73. The method of claim 1, wherein the second goods are beverages.

74. The method of claim 69, wherein the second goods are beverages.

75. The method of claim 70, wherein the second goods are beverages.

76. The method of claim 71, wherein the second goods are beverages.

77. The method of claim 72, wherein the second goods are beverages.

78. The method of claim 19, wherein the first goods dispensing apparatus is a gasoline pump and the second goods dispensing apparatus is a food vending machine.

79. The method of claim 78, wherein said gasoline pump and said food vending machine are in close enough proximity so that each is visible from the other.

80. The method of claim 79, wherein said gasoline pump and said food vending machine are disposed on a common gasoline island area of a gasoline station.

81. The method of claim 79, wherein said gasoline pump and said food vending machine are both disposed outside of an associated service station building.

82. The method of claim 19, wherein the second goods are beverages.

83. The method of claim 78, wherein the second goods are beverages.

84. The method of claim 79, wherein the second goods are beverages.

85. The method of claim 80, wherein the second goods are beverages.

86. The method of claim 81, wherein the second goods are beverages.

87. The goods dispensing apparatus of claim 38, wherein the second goods dispensing apparatus is a gasoline pump and the first goods dispensing apparatus is a food vending machine.

88. The goods dispensing apparatus of claim 87, wherein said gasoline pump and said food vending machine are in close enough proximity so that each is visible from the other.

89. The goods dispensing apparatus of claim 88, wherein said gasoline pump and said food vending machine are disposed on a common gasoline island area of a gasoline station.

90. The goods dispensing apparatus of claim 88, wherein said gasoline pump and said food vending machine are both disposed outside of an associated service station building.

91. The goods dispensing apparatus of claim 38, wherein the first goods are beverages.

92. The method of claim 87, wherein the first goods are beverages.

93. The goods dispensing apparatus of claim 88, wherein the first goods are beverages.

94. The goods dispensing apparatus of claim 89, wherein the first goods are beverages.

95. The goods dispensing apparatus of claim 90, wherein the first goods are beverages.

96. The goods dispensing apparatus of claim 50, wherein the second goods dispensing apparatus is a gasoline pump and the first goods dispensing apparatus is a food vending machine.

97. The goods dispensing apparatus of claim 96, wherein said gasoline pump and said food vending machine are in close enough proximity so that each is visible from the other.

98. The goods dispensing apparatus of claim 97, wherein said gasoline pump and said food vending machine are disposed on a common gasoline island area of a gasoline station.

99. The goods dispensing apparatus of claim 97, wherein said gasoline pump and said food vending machine are both disposed outside of an associated service station building.

100. The goods dispensing apparatus of claim 80, wherein the first goods are beverages.

101. The method of claim 96, wherein the first goods are beverages.

102. The goods dispensing apparatus of claim 97, wherein the first goods are beverages.

103. The goods dispensing apparatus of claim 98, wherein the first goods are beverages.

104. The goods dispensing apparatus of claim 99 wherein the first goods are beverages.

105. A method of dispensing vendable goods from a vending machine proximately located to a gasoline pump, comprising the steps of:
   (a) reading a credit card at the gasoline pump;
   (b) receiving a user selected request, associated with the purchase of vendable goods, at the gasoline pump;
   (c) activating the gasoline pump for dispensing gasoline;
   (d) generating a code in response to receipt of a user selected request in step (b);
   (e) billing an amount for the dispensed gasoline and purchased vendable goods, if an affirmative request is received in step (b), to the credit card;
   (f) printing and outputting a receipt at the gasoline pump of the billed amount, wherein the receipt includes the generated code which is usable for dispensing the vendable goods from the vending machine, if an affirmative request is received in step (b).

106. The method of claim 105, wherein the code is generated in step (d) based, in part, upon information related to the vendable goods requested by the user.

107. The method of claim 105, wherein the code of the receipt printed in step (f) is machine readable.

108. The method of claim 105, wherein the code of the receipt printed in step (f) is human readable.

109. The method of claim 105, further comprising the step of:

(g) receiving a user selected quantity of vendable goods, at the gasoline pump, if an affirmative request is received in step (b).

110. The method of claim 109, wherein the code is generated, in part, based upon the received selected quantity of vendable goods of step (g).

111. The method of claim 110, wherein the code of the receipt printed in step (f) is machine readable.

112. The method of claim 110, wherein the code of the receipt printed in step (f) is human readable.

113. The method of claim 111, wherein the receipt printed in step (f) containing the machine readable code, is insertable in the vending machine, for securing the selected quantity of purchased vendable goods.

114. The method of claim 105, further comprising the step of:

(h) receiving a user selected request, associated with the purchase additional vendable goods, at the gasoline pump, subsequent to step (c) and prior to step (e), wherein the billed amount of step (e) is for the dispensed gasoline, purchased vendable goods, if an affirmative request is received in step (b), and additionally purchased vendable goods, if an additional affirmative request is received in step (h).

115. The method of claim 105, further comprising the step of:

(g) attempting to secure approval of the credit card immediately after the credit card is read in step (a), wherein steps (b)–(f) are skipped, upon failing to secure approval in step (g).

116. The method of claim 105, further comprising the step of:

(g) storing the received user selected request of step (b).

117. The method of claim 109, further comprising the step of:

(h) storing the received user selected request of step (b), wherein the step (g) is skipped if the stored user selected request is not indicative of a user requesting the purchase of vendable goods from the vending machine apparatus.

118. The method of claim 117, further comprising the step of:

(i) storing the received user selected quantity of step (g).

119. The method of claim 106, further comprising the step of:

(g) receiving the generated code, printed on a receipt in step (f), in the vending machine.

120. The method of claim 107, further comprising the step of:

(g) receiving a machine readable receipt including the generated code, printed in step (f), in the vending machine.

121. The method of claim 110, further comprising the step of:

(h) receiving the generated code, printed in step (f), in the vending machine.

122. The method of claim 111, further comprising the step of:

(h) receiving a machine readable receipt including the generated code, printed in step (f), in the vending machine.

123. A method of dispensing vendable goods from a vending machine proximately located to a gasoline pump, comprising the steps of:

(a) reading a credit card at the gasoline pump;

(b) receiving a user selected request, associated with the purchase of vendable goods, at the gasoline pump;

(c) generating a code in response to receipt of a user selected request in step (b), and outputting the generated code to the vending machine;

(d) activating the vending machine for dispensing vendable goods in response to receipt of the code generated in step (c);

(e) activating the gasoline pump for dispensing gasoline; and (f) billing an amount for the dispensed gasoline and the purchased vendable goods, if an affirmative request is received in step (b), to the credit card.

124. The method of claim 123, further comprising the step of:

(g) receiving a user selected quantity of vendable goods to be purchased, at the gasoline pump, if an affirmative request is received in step (b), wherein the generated code is based, in part, upon the received user selected quantity and wherein the billed amount of step (f) includes an amount for the dispensed gasoline and an amount for the selected quantity of vendable goods, if an affirmative request is received in step (b).

125. The method of claim 124, further comprising the step of:

(h) receiving a user selected type of vendable goods to be purchased from the vending machine, at the gasoline pump, if an affirmative request is received in step (b), wherein the generated code is based, in part, upon the received user selected type of vendable goods.

126. The method of claim 125, wherein step (h) is repeated, at most, a number of times equal in number to the received selected quantity of step (g).

127. The method of claim 125, further comprising the step of:

(i) instructing the vending machine to automatically dispense the received selected types and quantities of vendable goods based upon the generated code.

128. The method of claim 123, further comprising the step of:

(g) instructing the vending machine, for each received selected type, to automatically dispense each selected vendable good from the vending machine.

129. The method of claim 127, further comprising the step of:

(j) printing and outputting a single receipt of the billed amount for the dispensed gasoline and the dispensed vendable goods, if an affirmative request is received in step (b).

130. The method of claim 128, further comprising the step of:

(j) printing and outputting a single receipt of the billed amount for the dispensed gasoline and the dispensed vendable goods, if an affirmative request is received in step (b).

131. The method of claim 123, further comprising the step of:

(g) receiving a second user selected request, associated with the purchase of additional vendable goods, at the gasoline pump subsequent to step (d) and prior to step (f), wherein the billed amount of step (f) is for the dispensed gasoline, purchased vendable goods, if an affirmative request is received in step (b), and additionally purchased vendable goods, if an affirmative request is additionally received in step (g).

132. The method of claim 123, further comprising the step of:
(g) attempting to secure approval of the credit card immediately after the credit card is read in step (a), wherein steps (b)–(f) are skipped upon failing to secure approval in step (g).

133. The method of claim 123, further comprising the step of:
(g) storing the received user selected request of step (b).

134. The method of claim 124, further comprising the step of:
(h) storing the user selected request of step (b), wherein step (g) is skipped if the stored user selected request is not indicative of a user requesting the purchase of vendable goods from the vending machine.

135. The method of claim 134, further comprising the step of:
(i) storing the user selected quantity received in step (g).

136. The method of claim 135, further comprising the step of:
(j) receiving a user selected a type of vendable goods to be purchased from the vending machine, at the gasoline pump, if an affirmative request is received in step (b); and
(k) storing the received user selected type of vendable goods received in step (j).

137. The method of claim 136, wherein step (j) is repeated, at most, a number of times equal in number to the selected quantity received in step (g).

138. The method of claim 125, wherein the received selected type of step (h) corresponds to a number selected at the gasoline pump, the number corresponding to a type of vendable good which is available for purchase from the vending machine.

139. The method of claim 138, wherein the selectable numbers at the gasoline pump exclude all types of goods sold out from the vending machine.

140. The method of claim 136, wherein the received selected type of step (j) corresponds to a number selected at the gasoline pump, the number corresponding to a type of vendable good which is available for purchase from the vending machine.

141. The method of claim 140, wherein the selectable numbers at the gasoline pump exclude all types of good soldout from the vending machine.

142. A vending machine, for dispensing vendable goods in conjunction with a proximately located gasoline pump, comprising:
first means for activating and controlling the vending machine in response to receipt of a transmission including a generated code, the code being generated in response to receipt, at the gasoline pump, of an input credit card and receipt of a user selected request to purchase vendable goods from the vending machine; and
second means, responsive to the first means, for dispensing purchased vendable goods from the vending machine based upon the received generated code, wherein an amount for dispensed gasoline from the gasoline pump and an amount for the dispensed vendable goods from the vending machine are billed to the credit card input into the gasoline pump.

143. The vending machine of claim 142, wherein the vendable goods are beverages.

144. The vending machine of claim 142, wherein the first means receives the generated code, which includes an indication of a user selected quantity of vendable goods to be dispensed by the second means obtained at the gasoline pump, the second means subsequently being controlled to dispense the received user selected quantity of vendable goods.

145. The vending machine of claim 144, wherein the code received by the first means further includes an indication of each user selected type of vendable goods to be dispensed by the second means obtained at the gasoline pump, the second means subsequently being controlled to dispense each received user selected type of vendable goods.

146. The vending machine of claim 145, wherein the code received by the first means includes a user selected type of vendable goods, at most, a number of times equal in number to the received user selected quantity.

147. The vending machine of claim 146, wherein the first means controls the second means to automatically dispense each received user selected type of vendable goods.

148. The vending machine of claim 146, wherein an amount for the user selected quantity of vendable goods is billed to the credit card input into the gasoline pump.

149. The vending machine of claim 145, wherein the first means further transmits an indication of types of vendable goods which are unavailable to be dispensed by the second means, to the gasoline pump to thereby exclude user selection of the unavailable types of vendable goods at the gasoline pump.

150. The vending machine of claim 142, wherein the transmission from the gasoline pump to the vending machine is a radio frequency transmission.

151. The vending machine of claim 142, wherein the transmission from the gasoline pump to the vending machine is an infrared transmission.

152. The goods dispensing apparatus of claim 142, wherein the transmission is a transmission through a wire connecting the gasoline pump and the vending machine.

153. A vending machine, for dispensing vendable goods in conjunction with a proximately located gasoline pump, comprising:
activation means for activating the vending machine in response to receipt of a transmission indicating receipt of an input credit card and receipt of a user selected request to purchase vendable goods from the vending machine;
input means, operatively connected to the activation means, for receiving an input code subsequent to the vending machine being activated, the input code being a code generated in response to receipt of the user selected request to purchase vendable goods; and
dispensing means, operatively connected to the input means, for dispensing vendable goods from the activated vending machine in response to the received input code, wherein an amount for dispensed gasoline from the gasoline pump and an amount for the dispensed vendable goods from the vending machine are billed to the credit card input into the gasoline pump.

154. The vending machine of claim 153, wherein the input code is based, in part, upon a selected quantity of vendable goods, the quantity being user selected at the gasoline pump.

155. The vending machine of claim 153, wherein the input code was previously displayed at the gasoline pump.

156. The vending machine of claim 153, wherein the input means includes a decoder for decoding machine readable input codes.

157. The vending machine of claim 153, wherein the input means includes a keypad.

158. The vending machine of claim 153, wherein the input code is printed on a receipt, the receipt being issued by the gasoline pump, further containing the amounts billed to the credit card.

159. The vending machine of claim 158, wherein the input code is machine readable.

160. The vending machine of claim 158, wherein the input code is human readable.

161. The vending machine of claim 159, wherein the input means includes a decoder for decoding machine readable input codes.

162. The vending machine of claim 161, wherein the input code is based, in part, upon a selected quantity of vendable goods, the quantity being user selected at the gasoline pump.

163. The vending machine of claim 160, wherein the input means includes a keypad.

164. The vending machine of claim 161, wherein the input code is based, in part, upon a selected quantity of vendable goods, the quantity being user selected at the gasoline pump.

165. The vending machine of claim 162, wherein the input code further is based, in part, upon a selected type of vendable goods, the type of vendable goods being user selected at the gasoline pump.

166. The vending machine of claim 164, wherein the input code further is based, in part, upon a selected type of vendable goods, the type of vendable goods being user selected at the gasoline pump.

167. The vending machine of claim 153, wherein the transmission from the gasoline pump to the vending machine is a radio frequency transmission.

168. The vending machine of claim 153, wherein the transmission from the gasoline pump to the vending machine is an infrared transmission.

169. The vending machine of claim 153, wherein the transmission is a transmission through a wire connecting the gasoline pump and the vending machine.

170. The vending machine of claim 153, wherein the input means includes a credit card reader for, upon reading an input credit card identical to the credit card input to the gasoline pump, within a predetermined period of time, controlling the dispensing of vendable goods from the dispensing means.

171. The vending machine of claim 153, wherein the vendable goods are beverages.

172. The method of claim 105, wherein said gasoline pump and said vending machine are in close enough proximity so that each is visible from the other.

173. The method of claim 105, wherein said gasoline pump and said vending machine are disposed on a common gasoline island area of a gasoline station.

174. The method of claim 105, wherein said gasoline pump and said vending machine are both disposed outside of an associated service station building.

175. The method of claim 105, wherein the vendable goods are beverages.

176. The method of claim 173, wherein the vendable goods are beverages.

177. The method of claim 174, wherein the vendable goods are beverages.

178. The method of claim 123, wherein said gasoline pump and said vending machine are in close enough proximity so that each is visible from the other.

179. The method of claim 123, wherein said gasoline pump and said vending machine are disposed on a common gasoline island area of a gasoline station.

180. The method of claim 123, wherein said gasoline pump and said vending machine are both disposed outside of an associated service station building.

181. The method of claim 123, wherein the vendable goods are beverages.

182. The method of claim 178, wherein the vendable goods are beverages.

183. The method of claim 179, wherein the vendable goods are beverages.

184. The method of claim 180, wherein the vendable goods are beverages.

185. The vending machine of claim 142, wherein said gasoline pump and said vending machine are in close enough proximity so that each is visible from the other.

186. The vending machine of claim 142, wherein said gasoline pump and said vending machine are disposed on a common gasoline island area of a gasoline station.

187. The vending machine of claim 142, wherein said gasoline pump and said vending machine are both disposed outside of an associated service station building.

188. The vending machine of claim 142, wherein the vendable goods are beverages.

189. The vending machine of claim 185, wherein the vendable goods are beverages.

190. The vending machine of claim 186, wherein the vendable goods are beverages.

191. The vending machine of claim 187, wherein the vendable goods are beverages.

192. The vending machine of claim 153, wherein said gasoline pump and said vending machine are in close enough proximity so that each is visible from the other.

193. The vending machine of claim 153, wherein said gasoline pump and said vending machine are disposed on a common gasoline island area of a gasoline station.

194. The vending machine of claim 153, wherein said gasoline pump and said vending machine are both disposed outside of an associated service station building.

195. The vending machine of claim 153, wherein the vendable goods are beverages.

196. The vending machine of claim 192, wherein the vendable goods are beverages.

197. The vending machine of claim 193, wherein the vendable goods are beverages.

198. The vending machine of claim 194, wherein the vendable goods are beverages.

* * * * *

UNITED STATES PATENT AND TRADEMARK OFFICE
CERTIFICATE OF CORRECTION

PATENT NO. : 6,193,154 B1
DATED : February 27, 2001
INVENTOR(S) : Paul Anderson Phillips et al.

It is certified that error appears in the above-identified patent and that said Letters Patent is hereby corrected as shown below:

Column 28, claim 10,
Line 34, after "step (f)", delete "if".

Column 31, claim 45,
Line 49, "second good dispensing" should read -- second goods dispensing --.

Column 31, claim 48,
Line 60, "The good dispensing" should read -- The goods dispensing --.

Column 32, claim 59,
Line 49, "goons" should read -- goods --.

Column 33, claim 65,
Line 6, "trans mission" should read -- transmission --.

Column 34, claim 100,
Line 35, "claim 80" should read -- claim 50 --.

Column 35, claim 114,
Line 22, "purchase additional" should read -- purchased additional --.

Column 37, claim 136,
Line 26, after "user selected", delete "a".

UNITED STATES PATENT AND TRADEMARK OFFICE
CERTIFICATE OF CORRECTION

PATENT NO. : 6,193,154 B1
DATED : February 27, 2001
INVENTOR(S) : Paul Anderson Phillips et al.

It is certified that error appears in the above-identified patent and that said Letters Patent is hereby corrected as shown below:

Column 37, claim 141,
Line 49, "all types of good" should read -- all types of goods --.

Column 39, claim 164,
Line 19, "claim 161" should read -- claim 163 --.

Signed and Sealed this

Sixth Day of November, 2001

*Attest:*

NICHOLAS P. GODICI
*Attesting Officer*     *Acting Director of the United States Patent and Trademark Office*